(12) United States Patent
Kim et al.

(10) Patent No.: US 9,747,067 B2
(45) Date of Patent: Aug. 29, 2017

(54) ELECTRONIC DEVICE AND OPERATING METHOD THEREOF

(71) Applicant: Samsung Electronics Co., Ltd., Gyeonggi-do (KR)

(72) Inventors: Jung-Hyun Kim, Gyeonggi-do (KR); Moon-Soo Kim, Seoul (KR); Dong-Sub Kim, Gyeonggi-do (KR); Hyun-Chang Shin, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 14/582,651

(22) Filed: Dec. 24, 2014

(65) Prior Publication Data

US 2015/0186093 A1     Jul. 2, 2015

(30) Foreign Application Priority Data

Dec. 24, 2013  (KR) .................. 10-2013-0162160

(51) Int. Cl.
| G09G 5/00 | (2006.01) |
| G06F 3/14 | (2006.01) |
| G06F 3/044 | (2006.01) |
| G06F 3/0354 | (2013.01) |
| G06F 1/16 | (2006.01) |
| G09G 3/20 | (2006.01) |
| G06F 3/0487 | (2013.01) |

(52) U.S. Cl.
CPC .......... *G06F 3/1423* (2013.01); *G06F 1/1647* (2013.01); *G06F 3/03545* (2013.01); *G06F 3/044* (2013.01); *G06F 3/0487* (2013.01); *G06F 3/14* (2013.01); *G09G 3/20* (2013.01); *G09G 5/00* (2013.01); *G06F 2203/04101* (2013.01); *G09G 2300/023* (2013.01); *G09G 2330/022* (2013.01); *G09G 2354/00* (2013.01); *G09G 2360/144* (2013.01)

(58) Field of Classification Search
CPC .. G06F 3/03547; G06F 1/1626; G06F 1/1601; G09G 2360/04
USPC ...... 345/169, 173, 207, 1.1; 455/556.1–556.2
See application file for complete search history.

(56) References Cited

U.S. PATENT DOCUMENTS

| 2010/0081475 | A1 | 4/2010 | Chiang et al. | |
| 2010/0182265 | A1* | 7/2010 | Kim | G06F 1/1616 345/173 |
| 2010/0298032 | A1* | 11/2010 | Lee | G06F 1/1616 455/566 |
| 2012/0194448 | A1* | 8/2012 | Rothkopf | A45C 13/002 345/173 |
| 2012/0220340 | A1 | 8/2012 | Sirpal et al. | |
| 2014/0204511 | A1* | 7/2014 | Oh | G06F 1/1632 361/679.01 |

(Continued)

FOREIGN PATENT DOCUMENTS

KR     10-2010-0125938     12/2012

*Primary Examiner* — Jennifer Nguyen
(74) *Attorney, Agent, or Firm* — The Farrell Law Firm, P.C.

(57) ABSTRACT

A method for controlling an electronic device electronically and functionally connectable to a cover is provided. The method includes detecting a position of the cover according to one of opening and closing of the cover and controlling one of a first display of the electronic device and a second display of the cover according to the detected position of the cover.

20 Claims, 52 Drawing Sheets

(56) References Cited

U.S. PATENT DOCUMENTS

2014/0210803 A1* 7/2014 Oh ........................ G09G 3/20
345/207

\* cited by examiner

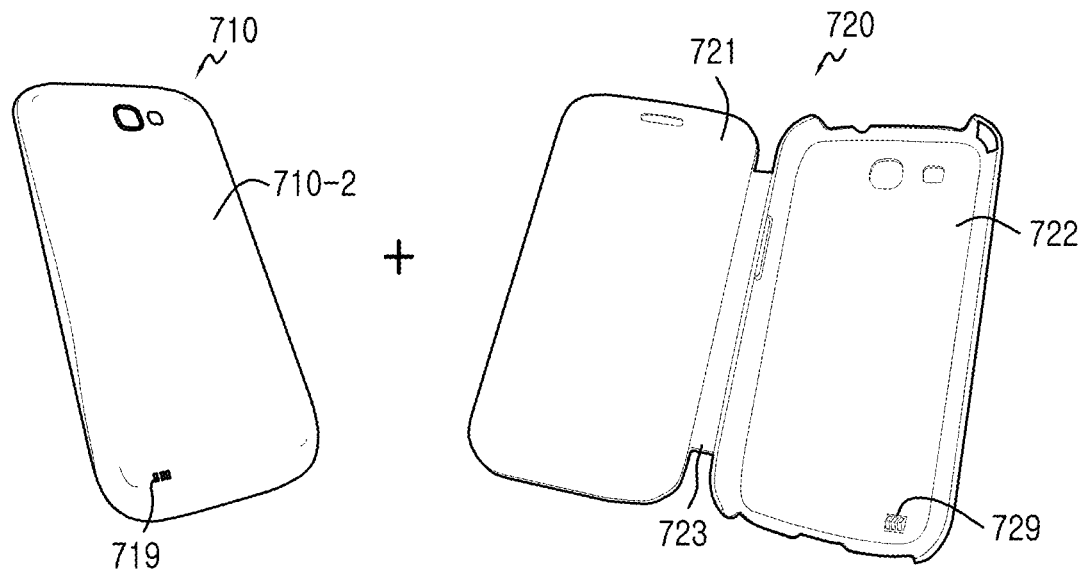
FIG.7B  FIG.7C
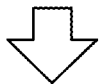
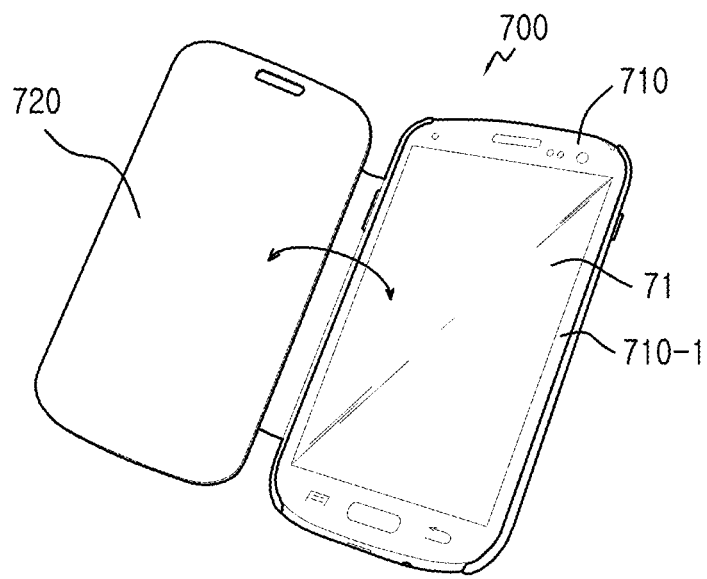
FIG.7A

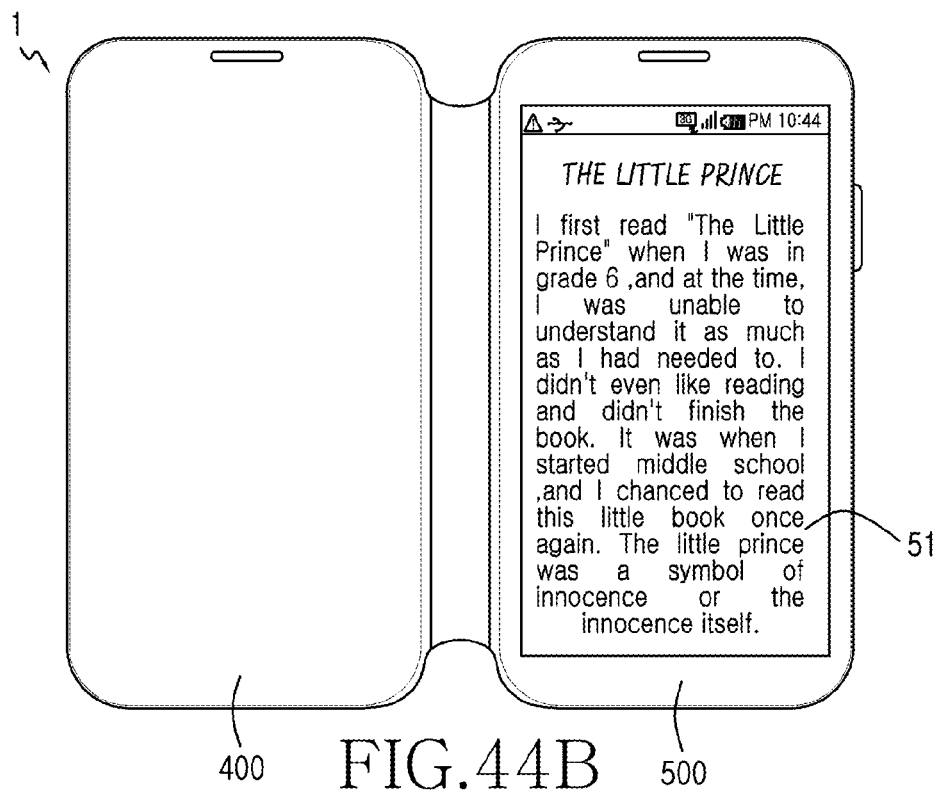
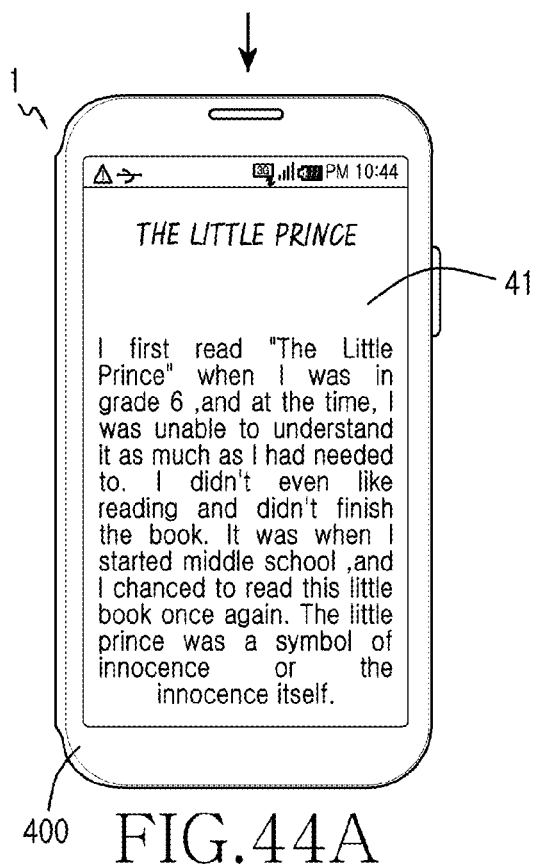
FIG.44B
FIG.44A

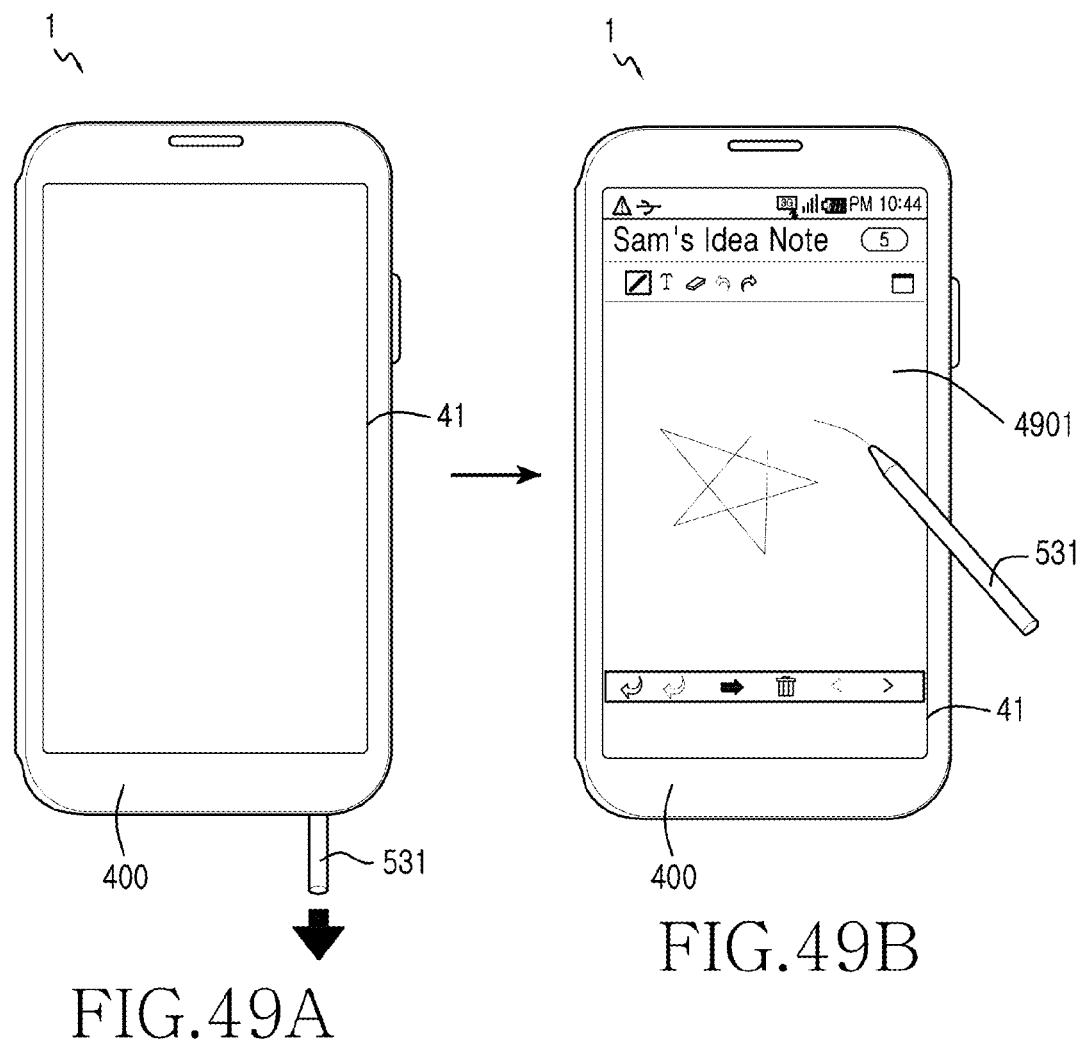

ELECTRONIC DEVICE AND OPERATING METHOD THEREOF

PRIORITY

The present application claims priority under 35 U.S.C. §119(a) to Korean Patent Application Serial No. 10-2013-162160, which was filed in the Korean Intellectual Property Office on Dec. 24, 2013, the entire content of which is incorporated herein by reference.

BACKGROUND OF THE INVENTION

1. Field of the Invention

The present invention relates generally to an electronic device and operating method thereof, and more particularly, to an electronic device including a cover for covering a display of the electronic device, and an operating method thereof.

2. Description of the Related Art

Thanks to advances in the electronic communication industry, a user device (e.g., an electronic device such as cellular phone, an electronic notebook, a personal digital assistant, and a laptop computer) has become one of the necessities in modern life and serves as an important means for information delivery, which changes rapidly. Such a user device facilitates a user's work in a graphical user interface (GUI) environment by using a touch screen, and provides various multimedia based content on a web environment.

The user device includes various electronic parts that are configured to perform various functions associated with the electronic device. For example, the user device may include a stylus for performing a writing and/or drawing function. Alternatively, or in addition thereto, the user device may include a speaker module for playing and listening to music. Alternatively, or in addition thereto, the user device may include a camera module for photographing an image. Alternatively, or in addition thereto, the user device may include a communication module for communicating with one or more other electronic devices, via a network.

SUMMARY OF THE INVENTION

The present invention has been made to address at least the above problems and disadvantages, and to provide at least the advantages described below.

To address the above-discussed deficiencies of the prior art, it is a primary aspect of the present disclosure to extend content display using a display of an electronic device.

Another aspect of the present disclosure is to control a display of a cover according to the cover including the display is opened or closed.

In accordance with an aspect of the present invention, a method for controlling an electronic device electronically and functionally connectable to a cover is provided. The method includes detecting a position of the cover according to one of opening and closing of the cover and controlling one of a first display of the electronic device and a second display of the cover according to the detected position of the cover.

In accordance with another aspect of the present invention, an electronic device electronically and functionally connectable to a cover is provided. The electronic device includes a first display, a sensor module configured to obtain detection data relating to one of opening and closing of the cover, wherein the cover is configured to cover at least part of the electronic device and includes a second display, and a processor configured to determine a position of the cover based on the detection data from the sensor module, and control one of the first display of the electronic device and the second display of the cover according to the determined position of the cover.

In accordance with yet another aspect of the present invention, an electronic device is provided. The electronic device includes a main body comprising a first display, a cover which is one of electrically and functionally coupled to the main body and is configured to cover at least part of the first display, a second display that is disposed in the cover, a sensor module that is configured to obtain detection data relating to one of opening and closing of the cover, and a processor that is configured to determine a position of the cover based on the detection data from the sensor module, and control one of the first display of the main body and the second display of the cover according to the determined position of the cover.

BRIEF DESCRIPTION OF THE DRAWINGS

The above and other aspects, features, and advantages of certain embodiments of the present invention will be more apparent from the following detailed description when read in conjunction with the accompanying drawings, in which:

FIGS. 7A-7C and 8 are perspective views of the electronic device, according to an embodiment of the present invention;

FIGS. 41 through 52 are diagrams of screen shots of the electronic device, according to an embodiment of the present invention.

DETAILED DESCRIPTION OF EMBODIMENTS OF THE PRESENT INVENTION

Figure 1:
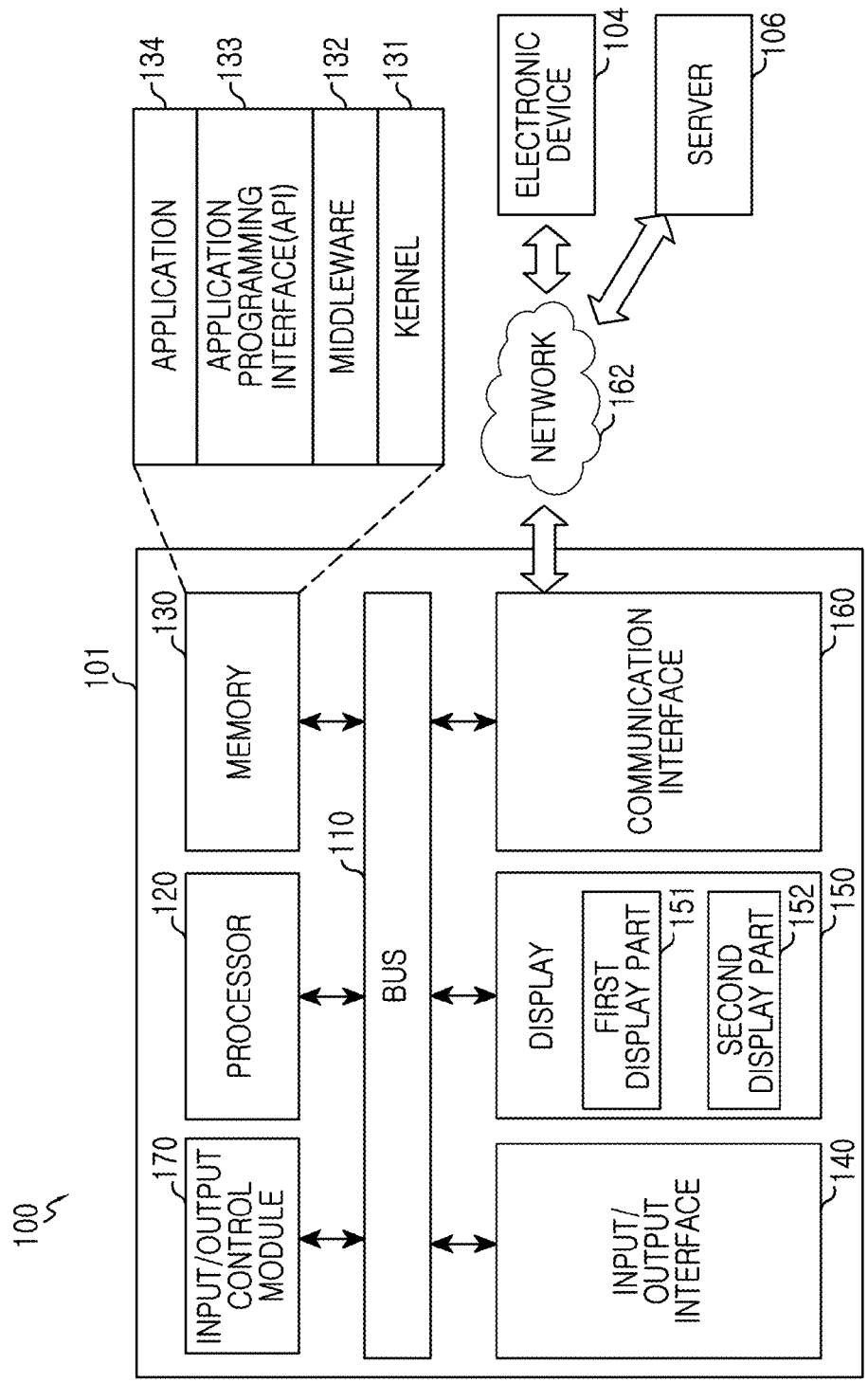
FIG. 1 is a diagram of a network environment including an electronic device, according to an embodiment of the present invention.

The following description with reference to the accompanying drawings is provided to assist in a comprehensive understanding of the embodiments of the invention as defined by the claims and their equivalents. It includes various specific details to assist in that understanding but these are to be regarded as mere examples. Accordingly, those of ordinary skill in the art will recognize that various changes and modifications of the embodiments described herein may be made without departing from the scope and spirit of the invention. In addition, descriptions of well-known functions and constructions may be omitted for clarity and conciseness.

The terms and words used in the following description and claims are not limited to their dictionary meanings, but, are merely used herein to enable a clear and consistent understanding of the invention. Accordingly, it should be apparent to those skilled in the art that the following description of the embodiments of the present invention is provided for illustration purposes only and not for the purpose of limiting the invention, as defined by the appended claims and their equivalents.

Definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

An electronic device according to various embodiments of the present invention may be a device that includes a communication function. For example, the electronic device may be embodied in the form of a smartphone, a tablet Personal Computer (PC), a mobile phone, a video phone, an e-book reader, a desktop PC, a laptop PC, a netbook computer, a personal digital assistant (PDA), a portable multimedia player (PMP), an MP3 player, a mobile medical appliance, a camera, a wearable device (e.g., a Head-Mounted-Device (HMD) such as electronic glasses), an electronic textile, an electronic bracelet, an electronic necklace, an electronic accessory, and a smart watch.

The electronic device may be a smart home appliance that has a communication function. The smart home appliance may include, for example, at least one of a television, a digital video disk (DVD) player, an audio system, a refrigerator, an air conditioner, a vacuum cleaner, an oven, a microwave oven, a washing machine, an air purifier, a set-top box, a TV box (e.g., Samsung HomeSync™, AppleTV™, or Google TV™), game consoles, an electronic dictionary, a digital key, a camcorder, and a digital frame.

The electronic device may include at least one of various medical appliances (e.g., magnetic resonance angiography (MRA), magnetic resonance imaging (MRI), computed tomography (CT), x-ray, ultrasonicator)), a navigation device, a global positioning system (GPS) receiver, an event data recorder (EDR), a flight data recorder (FDR), an in-vehicle infotainment device, marine electronic equipment (e.g., marine navigation device and gyro compass), avionics, and a security device.

The electronic device may include at least one of a pan of furniture or building/structure having the communication function, an electronic board, an electronic signature receiving device, a projector, and various gauges (e.g., gauges for water, electricity, or radio wave). The electronic device may be one or a combination of those various devices. Those skilled in the art shall understand that the electronic device of the present invention is not limited those devices.

The term 'user' may indicate a person or a device (e.g., an artificial intelligence electronic device) who or which uses the electronic device.

FIG. 1 is a diagram of a network environment 100 including an electronic device 101, according to an embodiment of the present invention. Referring to FIG. 1, the electronic device 101 includes a bus 110, a processor 120, a memory 130, an input/output interface 140, a display 150, a communication interface 160, and an input/output control module 170.

The bus 110 may be a circuit for interlinking the above-stated components and transferring communication (e.g., control messages) between the components.

The processor 120 receives an instruction from the components (e.g., the memory 130, the input/output interface 140, the display 150, the communication interface 160, and the input/output control module 170) via the bus 110, interprets the received instruction, and performs an operation or a data processing according to the interpreted instruction.

The memory 130 stores the instruction or the data received from or generated by the processor 120 or the other components (e.g. the input/output interface 140, the display 150, the communication interface 160, and the input/output control module 170). For example, the memory 130 includes programming modules including a kernel 131, middleware 132, an application programming interface (API) 133, and an application 134. The programming modules may be implemented using software, firmware, and hardware, or a combination of at least two of them.

The kernel 131 controls or manages system resources (e.g., the bus 110, the processor 120, or the memory 130) used to execute the operation or the function of the other programming modules, for example, the middleware 132, the API 133, and the application 134. The kernel 131 provides an interface thereby allowing the middleware 132, the API 133, or the application 134 to access and/or control or manage the individual component of the electronic device 100.

The middleware 132 relays data between the API 133 or the application 134 and the kernel 131. The middleware 132 performs load balancing for work requests received from the applications 134 by giving priority for using the system resource (e.g., the bus 110, the processor 120, or the memory 130) of the electronic device 101 to at least one of the applications 134.

The API 133, which is an interface for the application 134 to control the kernel 131 or the middleware 132, may include at least one interface or function (e.g., instruction) for file control, window control, image processing, or text control.

The application 134 may include a short message service (SMS)/multimedia messaging service (MSM) application, an e-mail application, a calendar application, an alarm application, a health care application (e.g., an application for measuring an exercise or a blood sugar), or an environment information application (e.g., an application for providing air pressure, humidity, or temperature information). Additionally, the application 134 may relate to information exchange between the electronic device 101 and an external electronic device 104. The information exchange application may include, for example, a notification relay application for relaying particular information to the external electronic device 104 or a device management application for managing the external electronic device.

For example, the notification relay application may relay the notification information of another application (e.g., the SMS/MMS application, the e-mail application, the health care application, or the environment information application) of the electronic device 101 to an external electronic device (e.g., the external electronic device 104. Additionally, the notification relay application may receive and provide the notification information from an external electronic device (e.g., the external electronic device 104) to the user. The device management application may turn on/off at least part of a function (e.g., or some components) of the external electronic device (e.g., the external electronic device 104), control brightness (or resolution) of the display, and manage (e.g., install, delete, or update) a service (e.g., a call service or a messaging service) provided by an application of the external electronic device 104.

The application 134 may include an application designated based on an attribute (e.g., a type of the electronic device) of an external electronic device (e.g., the electronic device 104). For example, when the external electronic device is an MP3 player, the application 134 may include a music play application. Similarly, when the external electronic device is a mobile medical device, the application 134 may include a health care application. The application 134 may include at least one of the applications designated in the electronic device 100 and the applications received from the external electronic device (e.g., a server 106 and/or the electronic device 104).

The input/output interface 140 forwards the instruction and/or the data input from a user through an input/output device (e.g., a sensor, a keyboard, or a touch screen) to, for example, the processor 120, the memory 130, the communication interface 160 or the input/output control module 170 via the bus 110. For example, the input/output interface 140 may forward the data of the user's touch input through the touch screen, to the processor 120. Moreover, the input/output interface 140 may output the instruction or the data received from the processor 120, the memory 130, the communication interface 160, or the input/output control module 170 via the bus 110, through an input/output device (e.g., a speaker or a display). Further, the input/output interface 140 may output voice data processed by the processor 120 to the user through the speaker.

The display 150 displays various information (e.g., multimedia data or text data) to the user and includes a plurality of display parts (e.g., a first display part 151 and a second display part 152). For example, the first display part 151 may be mounted in a main body, which is not shown, and the second display part 152 may be mounted in a (electronic) cover, which is not shown, that is electrically or functionally coupled to the main body. The cover may be configured to cover at least part of a screen of the main body and may be detached from the main body.

The communication interface 160 enables communication between the electronic device 101 and an external device (e.g., the external electronic device 104 or the server 106). For example, the communication interface 160 may communicate with the external electronic device 104 by accessing the network 162 using wireless communication or wired communication. The wireless communication may include at least one of, for example, Wi-Fi, Bluetooth (BT), near field communication (NFC), GPS, and cellular communication (e.g., long term evolution (LTE), LTE-advanced (LTE-A), code division multiple access (CDMA), wideband CDMA (WCDMA), universal mobile telecommunications system (UMTS), WiBro, or global system for mobile communications (GSM)). The wired communication may include at least one of, for example, universal serial bus (USB), high definition multimedia interface (HDMI), recommended standard (RS) 232, and plain old telephone service (POTS).

The network 162 may be a telecommunications network. The telecommunications network may include at least one of a computer network, Internet, Internet of things, and a telephone network. A communication protocol (e.g., transport layer protocol, data link layer protocol, or physical layer protocol) between the electronic device 101 and an external device may be supported by at least one of the application 134, the API 133, the middleware 132, the kernel 131, and the communication interface 160.

The input/output control module 170 processes at least part of information obtained from the other components (e.g., the processor 120, the memory 130, the input/output interface 140, and the communication interface 160), and provides the processed information to the user in various manners. For example, the input/output control module 170 controls at least part of the electronic device 101 to operate with another electronic device (e.g., the external electronic device 104 or the server 106) by use of the processor 120 or independently from the processor 120. The input/output control module 170 shall be explained by referring to FIGS. 9 through 52.

Figure 2:
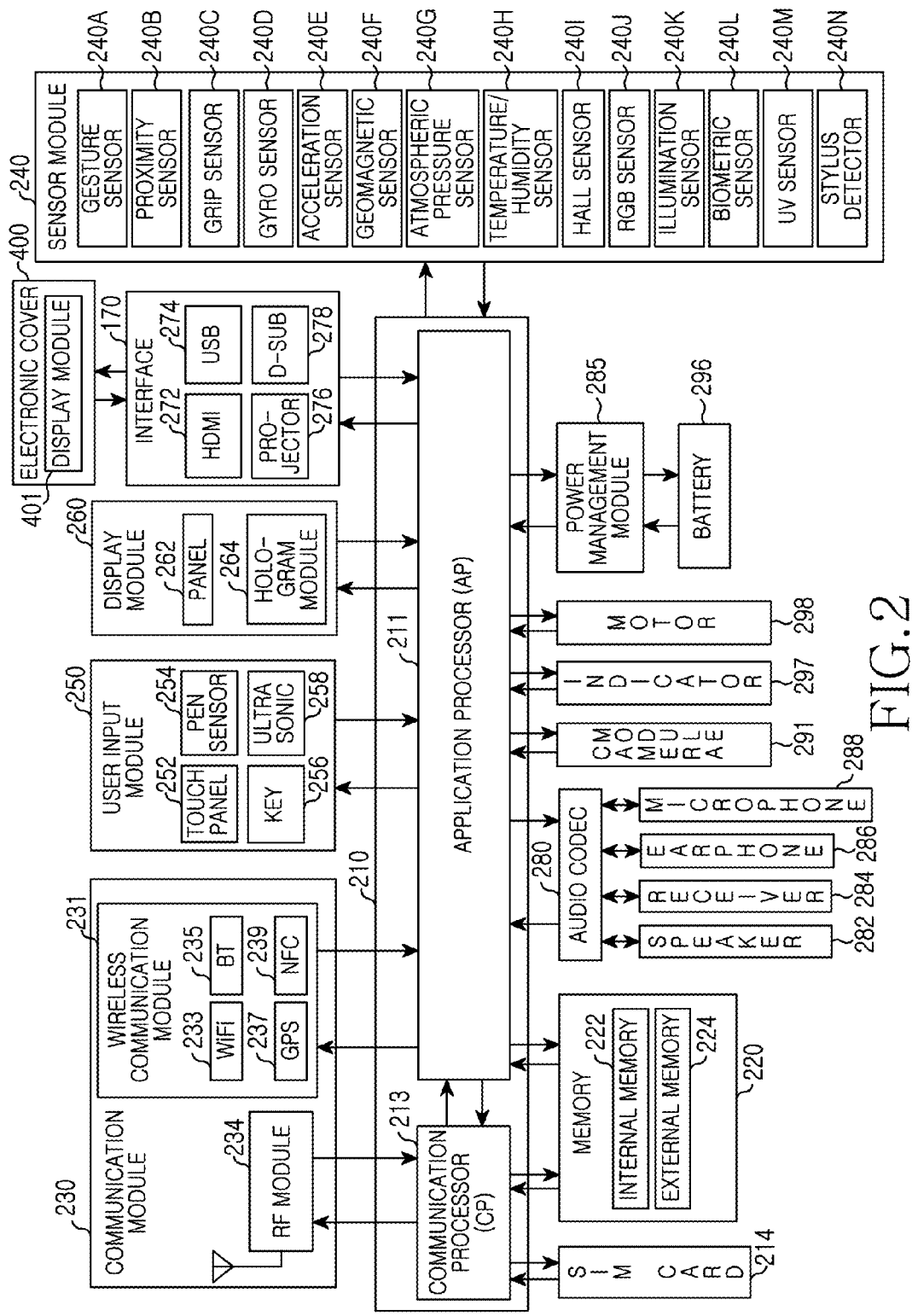
FIG. 2 is a block diagram of the electronic device, according to an embodiment of the present invention.

FIG. 2 is a block diagram of an electronic device 200 according to an embodiment of the present invention. The electronic device 200 may include all or part of the components associated with the electronic device 101 of FIG. 1.

Referring to FIG. 2, the electronic device 200 includes at least one processor 210, a subscriber identity module (SIM) card 214, a memory 220, a communication module 230, a sensor module 240, a user input module 250, a display module 260, an interface 270, an audio codec 280, a camera module 291, a power management module 285, a battery 296, an indicator 297, a motor 298, and an electronic cover 400.

The processor 210 includes at least one application processor (AP) 211 and at least one communication processor (CP) 213. While the AP 211 and the CP 213 are included in the processor 210 of FIG. 2, the AP 211 and the CP 213 may be included in different integrated circuit (IC) packages. The AP 211 and the CP 213 may be included in a single IC package.

The AP 211 controls hardware or software components connected to the AP 211 by driving an operating system or an application program and carries out data processing and operations including multimedia data. For example, the AP 211 may be implemented using a system on chip (SoC). The processor 210 may further include a graphics processing unit (GPU) (not shown).

The CP 213 manages data links and converts the communication protocol in the communication between the hardware connected to the electronic device 200 over the network. For example, the CP 213 may be implemented using a SoC. The CP 213 performs at least part of the multimedia control function. The CP 213 identifies and authenticates a terminal in the communication network using the SIM card 214. The CP 213 provides the user with services such as voice telephony, video telephony, text message, and packet data.

The CP 213 controls the data transmission and reception of the communication module 230. While the CP 213, the power management module 295, and the memory 220 are separated from the AP 211 in FIG. 2, the AP 211 may include at least part (e.g., the CP 213) of those components.

The AP 211 and/or the CP 213 may load and process the instruction or the data received from its non-volatile memory or at least one of the other components, in a volatile memory. The AP 211 and/or the CP 213 may store data received from or generated by at least one of the other components, in the non-volatile memory.

The SIM card 214 may be inserted to a slot formed at a specific location of the electronic device 200. The SIM card 214 contains unique identification information (e.g., integrated circuit card identifier (ICCID)) or subscriber information (e.g., international mobile subscriber identity (IMSI)).

The memory 220 (e.g., the memory 130) includes an internal memory 222 and an external memory 224. The internal memory 222 may include at least one of, for example, the volatile memory (e.g., dynamic random access memory (DRAM), static RAM (SRAM), synchronous DRAM (SDRAM)) and the non-volatile memory (e.g., one-time programmable read only memory (OTPROM), PROM, erasable PROM (EPROM), electrically EPROM (EEPROM), mask ROM, flash ROM, NAND flash memory, NOR flash memory). The internal memory 222 may employ a solid state drive (SSD). The external memory 224 may further include, for example, a compact flash (CF), a secure digital (SD), a micro-SD, a mini-SD, an extreme digital (xD), and a memory stick.

The communication module 230 (e.g., the communication interface 160) includes a wireless communication module 231 and a radio frequency (RF) module 234. For example, the wireless communication module 231 may include a Wi-Fi 233, a BT 235, a GPS 237, and an NFC 239. For example, the wireless communication module 231 may provide the wireless communication function using a radio frequency. Additionally or substantially, the wireless communication module 231 may include a network interface (e.g., LAN card) or a modem for connecting the electronic device 200 to the network (e.g., Internet, LAN, WAN, telecommunication network, cellular network, satellite network, or POTS).

The RF module 234 transmits and receives the data, for example, an RF signal or a paged electric signal. For example, the RF module 234 may include a transceiver, a pulse amplitude modulation (PAM), a frequency filter, or a low noise amplifier (LNA) which are not shown. The RF module 234 may further include a component, for example, a conductor or a conducting wire for sending and receiving electromagnetic waves in free space in the wireless communication.

The sensor module 240 includes at least one of a gesture sensor 240A, a proximity sensor 240B, a grip sensor 240C, a gyro sensor 240D, an acceleration sensor 240E, a geo-magnetic sensor 240F, an atmospheric pressure sensor 240G a temperature/humidity sensor 240H, a Hall sensor 240I, a red green blue (RGB) sensor 240J, an illumination sensor 240K, a biometric sensor 240L, an ultraviolet (UV) sensor 240M, and a stylus detector 240N. The sensor module 240 measures a physical quantity or detects an operation status of the hardware, and converts the measured or detected information to an electric signal. Additionally, the sensor module 240 may include an e-noise sensor, an electromyography (EMG) sensor, an electroencephalogram (EEG) sensor, an electrocardiogram (ECG) sensor, or a finger print sensor. The sensor module 240 may further include a control circuit for controlling its one or more sensors.

The sensor module 240 obtains data relating to whether the electronic cover 400 is opened or closed. For example, the sensor module 240 may obtain the data relating to whether the electronic cover 400 is opened or closed using the Hall sensor 240I, i.e., in response to a magnetic field associated with the electronic cover 400 and/or the electronic device 200. The sensor module 240 may obtain the data relating to whether the electronic cover 400 is opened or closed using the proximity sensor 240B, i.e., in response to a position of the electronic cover 400 relative to the electronic device 200. The sensor module 240 may obtain motion data of the main body of the electronic device 200 in relation to the opened or closed configuration of the electronic cover 400 using the gyro sensor 240D, the geomagnetic sensor 240F, or the acceleration sensor 240E. The sensor module 240 may obtain brightness data relating to the opened or closed configuration of the electronic cover 400 using the light sensor 240K.

The processor 210 may obtain data relating to the opened or closed configuration of the electronic device 200, from the sensor module 240, and may identify a position of the electronic device 200. For example, the electronic cover 400 may be closed and superposed below or onto the main body, opened but not overlapped with the main body, or opened and superposed below or onto the main body.

The processor 210 obtains image data of a subject using the camera module 291 (e.g., an image sensor), and identifies a position of the electronic cover 404 based on the image data. The image sensor may be included in the sensor module 240.

The processor 210 controls (e.g., activate or deactivate) the display modules 230 and 41 according to a position of the electronic cover 400. The processor 210 controls (e.g., activate or deactivate) the touch detection module (e.g., the touch panel 252 or the pen sensor 254) according to a position of the electronic cover 400. Herein, the term "activate" may mean "use" or "able", and the term "deactivate" may mean "not use" or "disable". The term "activate" may mean "drive" and the term "deactivate" may mean "not drive". The term "activate" may mean "input/output" (e.g., display, input) and the term "deactivate" may mean "not input/output". For example, the activated display module is ready to display content or is displaying content by receiving power, and the deactivated display module may not display the content without power.

The user input module 250 includes a touch panel 252, a (digital) pen sensor (e.g., a digitizer) 254, a key 256, and an ultrasonic input device 258. The touch panel 252 recognizes the touch input using at least one of capacitive, resistive, infrared, and surface acoustic wave (SAW) techniques. The touch panel 252 may further include a controller (not shown). The capacitive touch panel may recognize not only the direct touch but also a proximity of one or more input devices, e.g., a stylus. The touch panel 252 may further include a tactile layer. In this case, the touch panel 252 may provide a tactile response to the user. The (digital) pen sensor 254 may be implemented using at least one of the capacitive, resistive, infrared, and SAW techniques which are the same or similar as or to the user's touch input, or using a separate recognition sheet. For example, the key 256 may include a keypad or a touch key. The ultrasonic input device 258 obtains data by detecting microwave energy in the electronic device 200 through the pen which generates an ultrasonic signal, and allows radio frequency identification. The electronic device 200 may receive the user input from an external device (e.g., a network, a computer, or a server) connected using the communication module 230.

The display module 260 (e.g., the display module 150) includes a panel 262 or a hologram module 264. For example, the panel 262 may employ a liquid crystal display (LCD) or an active matrix organic light emitting diode (AMOLED). For example, the panel 262 may be implemented flexibly, transparently, or wearably. The panel 262 may be constructed as a single module with the touch panel 252. The hologram module 264 may generate a three-dimensional image in the air using interference of light. The display module 260 may further include a control circuit for controlling the panel 262 or the hologram module 264.

The interface 270 includes, for example, a high definition multimedia interface (HDMI) 272, a universal serial bus (USB) 274, a projector 276, and a D-sub 278. Additionally, the interface 270 may include, for example, a SD/Multi-Media Card (MMC) or IrDA.

The audio codec 280 converts the voice to an electric signal and vice versa. For example, the audio codec 280 converts voice information which is input or output through a speaker 282, a receiver 284, an earphone 286, or the microphone 288.

The camera module 291 captures a still picture and a moving picture, and includes at least one image sensor (e.g., a front lens or a rear lens) or an image signal processor (ISP).

The power management module 295 manages power of the electronic device 200 and may include, for example, a power management IC (PMIC), a charger IC, or a battery fuel gauge, which are not shown.

The PMIC may be mounted in an IC or a SoC semiconductor. The charging type may be divided to a wired type and a wireless type. The charging IC may charge the battery and/or prevent overvoltage or overcurrent from flowing from a charger. The charger IC may include a charger IC for at least one of the wired charging type or the wireless charging type. For example, the wireless charging type includes magnetic resonance, magnetic induction, and microwave, and may further include an additional circuit, for example, coil loop, resonance circuit, rectifier circuit for the wireless charging.

The battery fuel gauge may measure the remaining capacity of the battery 296 and/or the voltage, the current, or the temperature of a charging operation. The battery 296 may supply the power by generating the electricity. For example, the battery 296 may be a rechargeable battery.

The indicator 297 displays a specific status, for example, booting state, message state, or charging state of the electronic device 200 or part (e.g. AP 211) of the electronic device 200. The motor 298 converts an electric signal to a mechanic vibration. A micro control unit (MCU) may control the sensor module 240.

The electronic cover 400 may include a display module 401. The display module 401 may include a panel (e.g., LCD, AMOLED, or electrophoretic Ink (E-ink)) which is not shown. The display module 401 may further include a control circuit for controlling the panel. The electronic cover 400 may include two opposite sides which are flat. The display module 401 may be disposed in at least one of the two opposite sides (e.g., the front side and the backside).

The electronic cover 400 may be electrically or functionally coupled to the processor 210 via the interface 270. Although it is not depicted, the electronic cover 400 may be coupled directly to the processor 210. The electronic cover 400 may wirelessly communicate with the processor 210 using the wireless communication module 231 (e.g., the Wi-Fi 233, the BT 235, the GPS 237, or the NFC 239).

The electronic cover 400 may be detachably mounted to an electronic device, thereby allowing the electronic cover 400 to be detached from an electronic device (e.g., the electronic device 200 and the electronic device 101).

The electronic cover 400 may be rotatably mounted to cover at least part of one side (e.g., the screen) of the display module 260.

Although it is not depicted, the electronic device 200 may further include a processor (e.g., GPU) for supporting mobile TV. For example, the processor for supporting the mobile TV may process media data in conformity with digital multimedia broadcasting (DMB), digital Video broadcasting (DVB), or media flow standard.

The names of the hardware components of the present invention may differ according to the type of the electronic device. The hardware of the present invention may include at least one of the components, omit some components, or further include other components. Some of the hardware components may be united to the single entity to carry out the same functions of the corresponding components.

Figure 3:
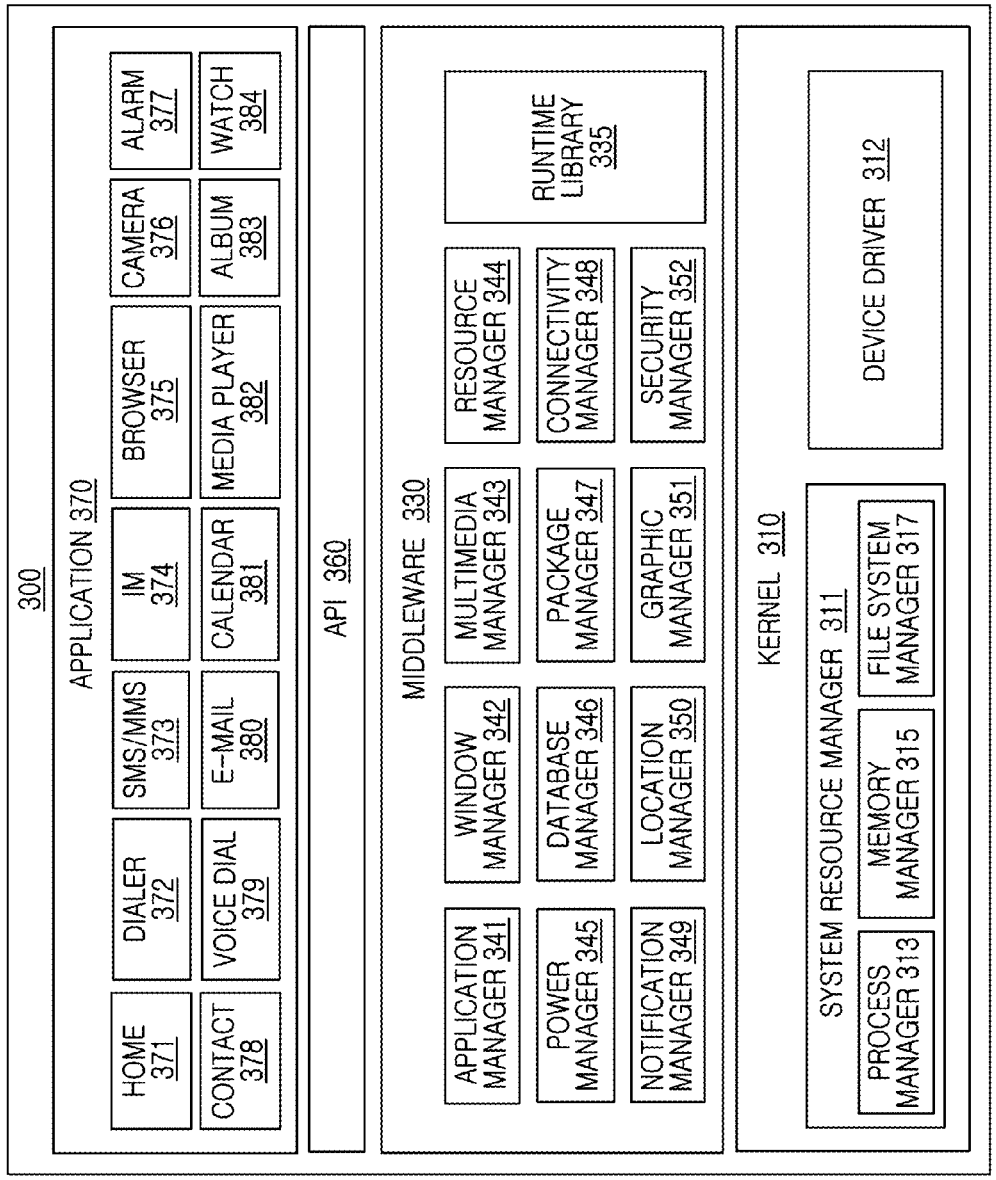
FIG. 3 is a block diagram of a programming module, according to an embodiment of the present invention.

FIG. 3 is a block diagram of the programming module, according to an embodiment of the present invention. The programming module 300 may be included (e.g. stored) in the electronic device 101 (e.g., the memory 130) of FIG. 1. At least part of the programming module 300 may include software, firmware, hardware, or a combination thereof. The programming module 300 may include an operating system (OS) for controlling resources of an electronic device (e.g., the electronic device 101 and/or 200) in the hardware, and various applications (e.g., an application 370) running on the OS. For example, the OS may include Android™, iOS, Windows™, Symbian™, Tizen™, and Bada™.

Referring to FIG. 3, the programming module 300 includes a kernel 310, a middleware 330, an API 360, and the application 370.

The kernel 310 (e.g., the kernel 131) includes a system resource manager 311 and a device driver 312. For example, the system resource manager 311 may include a process manager 313, a memory manager 315, and a file system manager 317. The system resource manager 311 controls, allocates, and/or reclaims a system resource. For example, the system resource manager 311 may control the device driver 312, which may include a display driver, a camera driver, a BT driver, a shared memory driver, a USB driver, a keypad driver, a Wi-Fi driver, and an audio driver. The device driver 312 may include an Inter-Process Communication (IPC) driver (not shown).

The middleware 330 may include a plurality of preset modules for providing the common function required by the application 370. The middleware 330 allows the application 370 to efficiently use the limited system resources of the electronic device, e.g., the electronic devices 101, 200, through the API 360. For example, as shown in FIG. 3, the middleware 330 (e.g., the middleware 132) includes at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include, for example, a library module used by a compiler to add a new function using a programming language, while the application 370 is running. The runtime library 335 functions for input/output, memory management, and arithmetic function.

The application manager 341 manages, for example, a life cycle of at least one of the applications 370. The window manager 342 manages GUI resources used in the screen. The multimedia manage 343 identifies a format required to play various media files, and encodes or decodes the media file using a codec suitable for the corresponding format. The resource manager 344 manages a source code, a memory, a storage space of at least one of the applications 370.

The power manager 345 manages a battery or power in association with BIOS, and provides power information for the operation of the electronic device. The database manager 346 manages generate, retrieve, or change a database to be used by at least one of the applications 370. The packet manager 347 manages installation or updating of the application distributed as a packet file.

The connectivity manager 348 manages, for example, the wireless connection of the Wi-Fi or the BT. The notification manager 349 displays and/or notifies an event of an incoming message, an appointment, and proximity to the user without interruption. The location manager 350 manages location information of the electronic device. The graphic manager 351 manages graphical effect for the user or its related user interface. The security manager 352 provides a security function for the system security or the user authentication. When the electronic device (e.g., the electronic device 101) includes a call function, the middleware 330 may further include a telephony manager (not shown) for managing the voice or video call function of the electronic device.

The middleware 330 generates and uses a new middleware module by combining various functions of the internal component modules. The middleware 330 provides a specialized module per OS so as to provide a differentiated function. The middleware 330 dynamically removes some components or adds new components. Hence, the embodiments of the present invention may omit some of the components, include other components, or replace with other components of similar functions.

The API 360 (e.g., the API 133), which is a set of API programming functions, may differ according to the OS. For example, Android™ and iOS may provide one API set per platform. Tizen™ may provide one or more API sets.

The application 370 (e.g., the application 134) may include, for example, a preload application or a third party application.

At least part of the programming module 300 may be implemented using an instruction stored in computer-readable storage media. When the one or more processors (e.g., the processors 120) execute the instruction, one or more processors may perform the function corresponding to the instruction. The computer-readable storage medium may be the memory 130. At least part of the programming module 300 may be realized (e.g., executed) by the processors 120. At least part of the programming module 300 may include a module, a program, a routine, an instruction set, or a process for one or more functions.

The names of the components of the programming module (e.g., the programming module 300) may differ according to the type of the OS. The programming module may include at least one of the components, omit some components, or further include other components.

Figure 4:
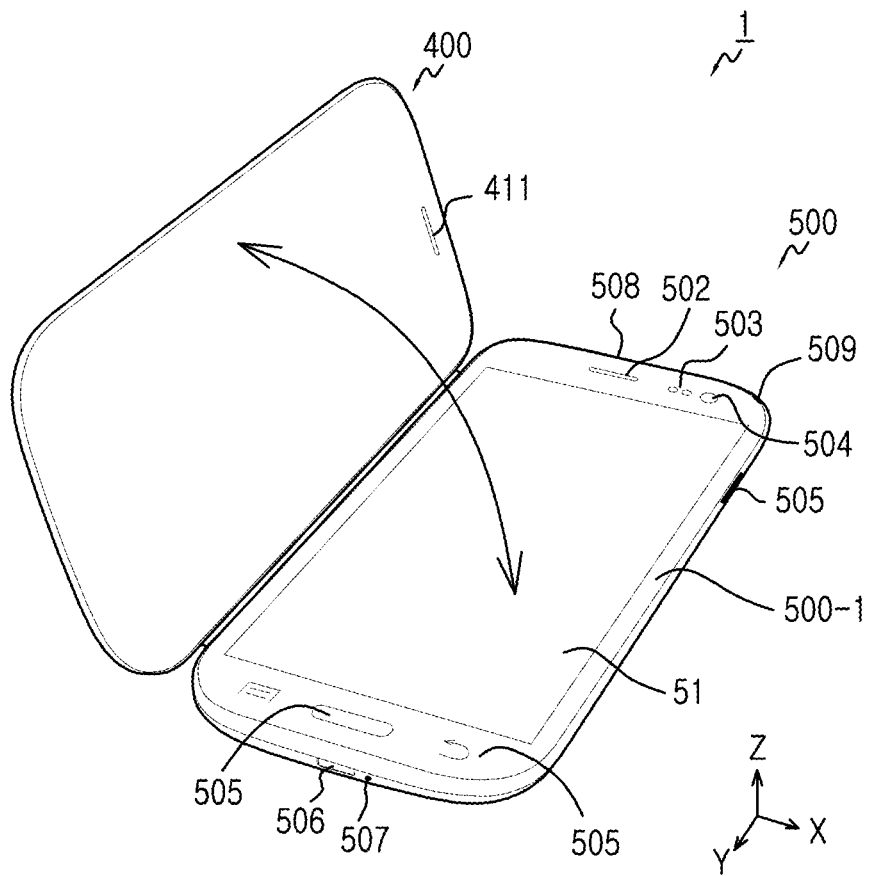
FIG. 4 is a perspective view of the electronic device, according to an embodiment of the present invention.

FIG. 4 is a perspective view of an electronic device 1, according to an embodiment of the present invention. The electronic device 1 may be, for example, the electronic device 200 of FIG. 2.

Referring to FIG. 4, the electronic device 1 includes a main body 500 and a cover 400.

The main body 500 includes a touch screen (or a display) 51, a speaker 502 (e.g., the speaker 282), at least one sensor 503 (e.g. the sensor module 240), a camera 504 (e.g., a camera module 291), at least one button 505 (e.g., the key 256), an external port 506 (e.g., the interface 270), a microphone 507 (e.g., the microphone 288), a jack 508, and an antenna 509.

Figure 5:
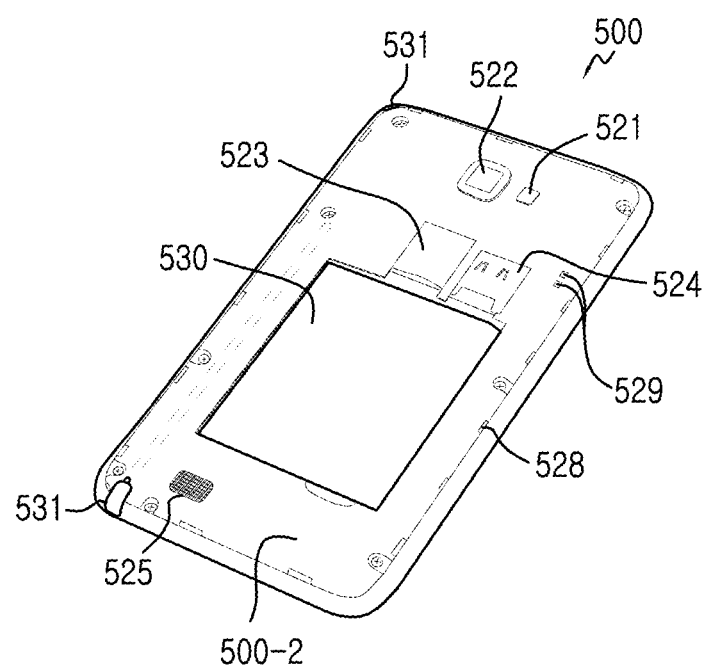
FIG. 5 is a perspective view of a main body of the electronic device, according to an embodiment of the present invention.

The touch screen 51 includes the display module 260 and the touch detection module (e.g., the touch panel 252 or the pen sensor 254) which are not shown in FIG. 5. The speaker 502 outputs an electric signal as the sound. The at least one sensor 503 measures the physical quantity or detects an operation status of the electronic device 1, and converts the measured or detected information to an electric signal. The at least one sensor 503 may be mounted at a particular location. The at least one sensor 503 may include at least one of a gesture sensor, a proximity sensor, a grip sensor, a gyro sensor, an acceleration sensor, a geomagnetic sensor, an atmospheric pressure sensor, a temperature/humidity sensor, a Hall sensor, an RGB sensor, a light sensor, a biometric sensor, a UV sensor, and a stylus detector (e.g., the sensors associated with the electronic device 200 shown in FIG. 2). The camera 504 captures a still picture and a moving picture, and includes one or more image sensors, an ISP (not shown), or a flash LED (not shown). The at least one button 505 may embodied in the form of a press key or a touch key. The at least one button may include a key for controlling the volume or a key for turning on or off. The external port 506 may be used to connect the HDMI, the USB, the projector, or the D-sub cable, or be used as a charging port. The microphone 507 converts the sound to the electric signal. The jack 508 electrically connects to a plug such as earphone or earset. The antenna 509 (e.g., a DMB antenna) may be extended out of the electronic device 1.

The cover 400 may be folded onto the main body 500 and cover (hide) at least part of a front side 500-1 (e.g., the screen) of the main body 500. The cover 400 may rotate (horizontally open and shut) based on one side of the horizontal direction (the direction where the horizontal length is shorter than the vertical length) of the main body 500. When the cover 400 is closed, the components (e.g., the touch screen 51, the at least one sensor 503, the camera 504, or the at least one button 505) disposed in one side of the main body 500 may be hidden. The cover 400 may include a through hole 411 corresponding to the speaker 502 of the main body 500.

FIG. 5 is a perspective view of the main body 500 of the electronic device 1, according to an embodiment of the present invention.

Referring to FIG. 5, the main body 500 may includes a flash 521 a camera 522, a plurality of memory sockets 523 and 524 (e.g., an SD card socket and an SIM card socket), a speaker 525, a plurality of hook grooves 528, at least one contact (or terminal) 529, a battery 530, and a stylus 531 in a rear side 500-2.

The hook grooves 528 may be used to join the cover 400 and the main body 500. The at least one contact 529 may be used to electrically connect the cover 400 and the main body 500.

Figure 6A:
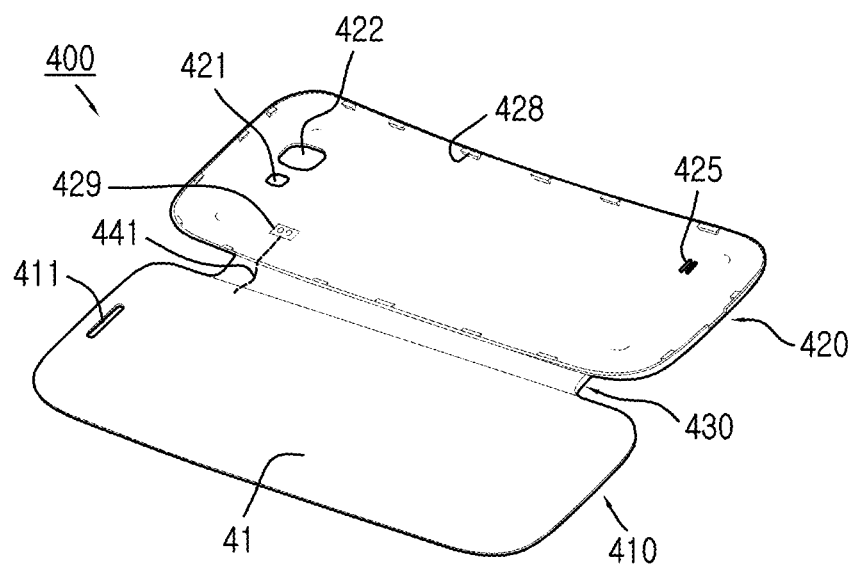
FIG. 6A is a perspective view of a cover.
Figure 6B:
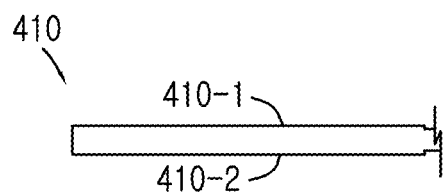
FIG. 6B is a side view of the cover, according to an embodiment of the present invention.

FIG. 6A is a perspective view of the cover 400, and FIG. 6B is a side view of the cover 400, according to an embodiment of the present invention.

Referring to FIGS. 6A and 6B, the cover 400 may include a first cover part 410, a second cover part 420, a connector 430, and an electric connection member 441.

The first cover part 410, which is the cover of the front side 500-1 of the main body 500, may rotate to cover or expose the screen of the main body 500. The first cover part 410 includes at least one display 41 (e.g. the display module 401) and a through hole 41. The at least one display 41 may be mounted in at least one of two opposite sides 410-1 and 410-2 (FIG. 6B) of the first cover part 410. When the first cover part 410 is closed, the display 41 of the cover 40 overlaps at least part of the screen of the main body 500 (not shown). A screen area of the display 41 of the cover 40 may be equal to or different from a screen area of the display 51 of the main body 500 (not shown). For example, the display 41 of the cover 40 may be in a small window shape (see FIG. 51, for example). The at least one display 41 may include the LCD, the AMOLED, or the E-ink. The through hole 411 discharges sound from the speaker 502 of FIG. 4 of the main body 500 to the outside even when the first cover part 410 is closed.

The second cover part 420, which is the cover of the rear side 500-2 of the main body 500 (FIG. 5), may be attached to or detached from the rear side 500-2 of the main body 500. The second cover part 420 is formed in a curved shape and may make the exterior of the electronic device 1. The second cover part 420 may cover the components (e.g., the memory sockets 523 and 524, the speaker 525, or the battery 530) at the rear side 500-2 of the main body 500.

The second cover pan 420 includes at least one of a flash hole 421, a camera hole 422, a speaker hole 425, and a plurality of hooks 428. Alternatively, or in addition thereto, the second cover part 420 includes at least one contact 429. The flash hole 521 exposes the flash 521 of the main body 400. The camera hole 422 exposes the camera 522 of the main body 400. The speaker hole 425 discharges the sound from the speaker 525 of the main body 400 to the outside. The hooks 428 may be disposed in an inner edge side of the second cover part 420. The hooks 428 may be fastened to the hook grooves 528 of the main body 500 in a snap-fit manner. The at least one contact 429 may be disposed inside the second cover part 420. The at least one contact 429 electrically contacts the at least one contact 529 of the main body 500. The at least one contact 429 may be electrically connected to the display 41 of the first cover part 410.

The connector 430 interconnects the first cover part 410 and the second cover part 420 and allow the first cover part 410 to rotate. The connector 430 covers a lateral side (e.g., a side interconnecting the upper and lower sides) of the main body 500. The connector 430 may include a material which is flexible and not easily broken by the frequent bending.

The electric connection member 441 electrically connects the at least one display 41 of the first cover part 410 to the at least one contact 429 of the second cover part 420. The electric connection member 441 may be interposed between the layered components of the cover 400 so as not to be exposed to the outside. The electric connection member 441 may be flexible. The electric connection member 441 may include a flexible printed circuit board (FPCB).

When the second cover part 420 is connected to the rear side 500-2 of the main body 500, the at least one display 41 of the first cover part 410 is electrically or functionally connected to the main body 500, and the main body 500 recognizes and controls the at least one display 41 of the cover 400.

FIGS. 7A-7C are perspective views of the electronic device 700, according to an embodiment of the present invention.

Referring to FIGS. 7A-7C, the electronic device 700 includes a main body 710 and a cover 720.

The main body 710 may include the components of the main body 500 of FIG. 4. The main body 710 may further include a rear cover (e.g., a battery cover), which is not shown, on a rear side 710-2. The main body 710 includes at least one contact 719 on a surface of the rear cover 710-2.

The cover 720 includes a first cover part 721, a second cover part 722, a connector 723, and at least one contact 729. The first cover part 721, which covers a front side 710-1 of the main body 710, may rotate to hide or expose a screen of the main body 710. The first cover part 721 may include at least one display in the front side or the rear side. The second cover part 722, which covers a rear side 710-2 of the main body 710, may be attached to or separated from the rear side 710-2 of the main body 710. The connector 723 interconnects the first cover part 721 and the second cover part 722. The at least one contact 729 is disposed inside the second cover 722 to electrically connect to the at least one contact 719 of the main body 710. The at least one contact 729 may be electrically connected to the at least one display of the first cover part 721.

Figure 8:
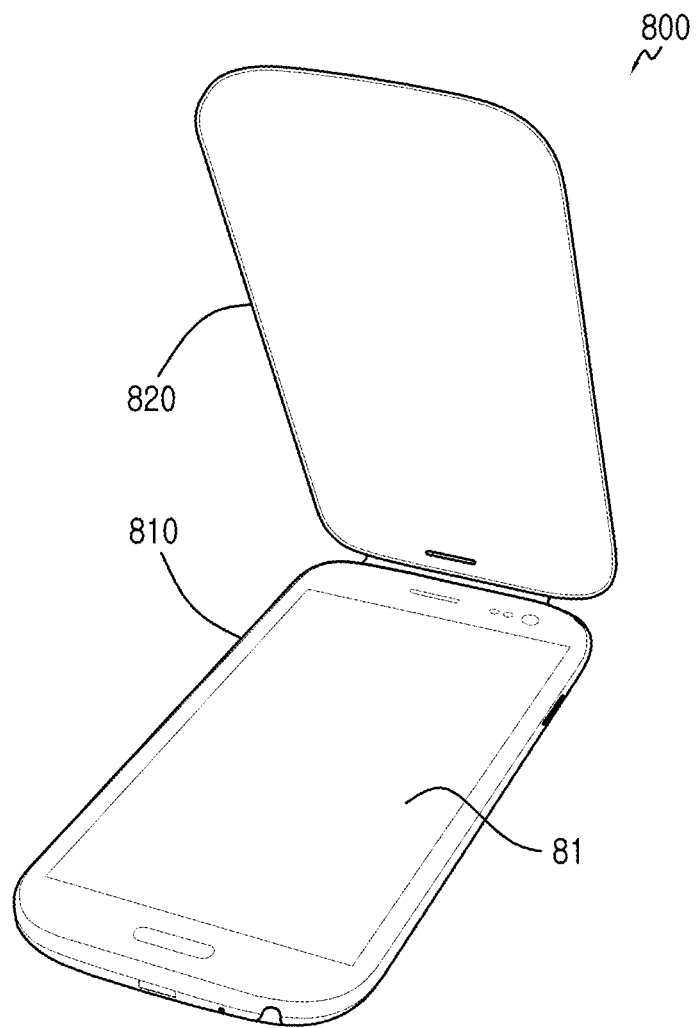

FIG. 8 is a perspective view of an electronic device 800, according to an embodiment of the present invention.

Referring to FIG. 8, the electronic device 800 (e.g., the electronic device 200) includes a main body 810 and a cover 820.

The main body 810 may be the main body 500 of FIG. 4.

A cover 820 may be folded to cover a screen 81 of the main body 810. The cover 820 may rotate (vertically open and shut) based on one side of the vertical direction (the direction where the vertical length is longer than the horizontal length) of the main body 810.

The cover 820 may include at least one display. The display of the cover 820 may be electrically or functionally coupled to the main body 810 and controlled by the main body 810.

Figure 9:
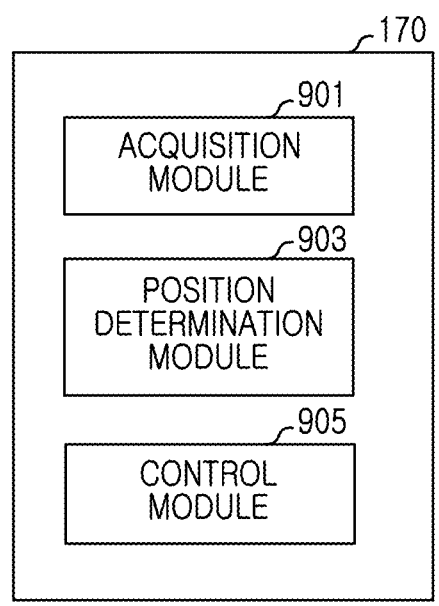
FIG. 9 is a block diagram of an input/output control module, according to an embodiment of the present invention.

FIG. 9 is a block diagram illustrating an input/output control module 170, according to an embodiment of the present invention.

Referring to FIG. 9, the input/output control module 170 includes an acquisition module 901, a position determination module 903, and a control module 905.

The acquisition module 901 (e.g., the processor 211) acquires data relating to the opening/closing of the cover 400 (e.g., the first cover part 410 of the cover 400). The acquisition module 901 acquires the opening/closing data of the cover 400 using at least one sensor (e.g., the gesture sensor 240A, the proximity sensor 240B, the grip sensor 240C, the gyro sensor 240D, the acceleration sensor 240E, the geomagnetic sensor 240F, the atmospheric pressure sensor 240G the temperature/humidity sensor 240H, the Hall sensor 240I, the RGB sensor 240J, the light sensor 240K, the biometric sensor 240L, the UV sensor 240M, the EMG sensor, the EEG sensor, the ECG sensor, and the finger print sensor).

The position determination module 903 (e.g., the processor 211) determines a position of the cover 400 (e.g., the first cover part 410) based on data fed from the acquisition module 901. For example, the cover 400 may be disposed at any one of a position when the cover 400 is closed and superposed beneath the main body 500, a position when the cover 400 is closed and superposed onto the main body 500, a position when the cover 400 is opened not to overlap the main body 500, a position when the cover 400 is opened and superposed beneath the main body 500, and a position when the cover 400 is opened and superposed on the main body 500.

The control module 905 (e.g., the processor 211) controls (e.g., activate or deactivate) the display 51 of the main body 500 or the at least one display 41 of the cover 400 according to a position of the cover 400 (e.g., the first cover part 410) determined by the position determination module 903. For example, the control module 905 (e.g., the processor 211) may switch screen modes of the application according to a position of the cover 400. When the cover 400 is closed, the main body 500 displays content (e.g., application content) on the display 41 of the outer surface of the cover 400. When the cover 400 is opened, the main body 500 switches the content displayed from the display 41 of the outer surface of the cover 400 to the display 51 of the main body 500.

The control module 905 (e.g., the processor 211) controls (e.g., activate or deactivate) the touch detection module (e.g., the touch panel 252 or the pen sensor 254) of the main body 500 according to a position of the cover (e.g., the first cover part 410).

Figure 10:
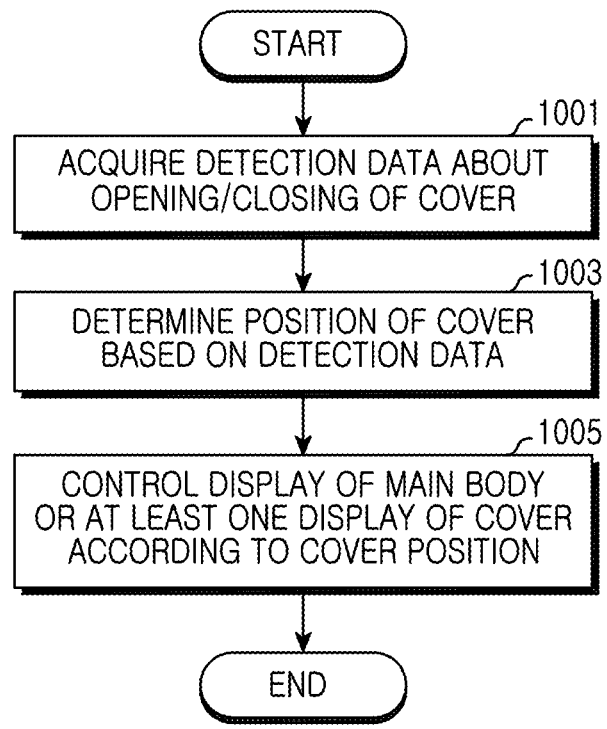
FIG. 10 is a flowchart illustrating a method for controlling the display, according to an embodiment of the present invention.

FIG. 10 is a flowchart illustrating a method for controlling the display, according to an embodiment of the present invention.

Referring to FIG. 10, at step 1001, the processor 211 (e.g., the acquisition module 910) acquires detection data about the opening/closing of the cover 400 (e.g., the first cover part 410). At step 1003, the processor 211 (e.g., the position determination module 903) determines the position of the cover based on the detection data about the opening/closing of the cover 400. At step 1005, the processor 211 (e.g., the control module 905) controls (e.g., activate or deactivate) the display (e.g., the panel 262) of the main body 500 or the at least one display 41 of the cover 400 according to the position of the cover 400.

Although not illustrated, when the cover 400 is attached to the main body 500, the processor 211 (e.g. the control module 905) detects information (e.g., the display type (e.g., the E-ink), a position (e.g., the front side or the rear side), etc.) relating to the at least one display 41 of the cover 400. Such information may be fed from a control circuit (e.g., an Integrated Circuit (IC)) of the cover 400. Hereafter, it is assumed that the processor 211 obtains the information of the at least one display 41 of the cover 400.

Figure 11A:
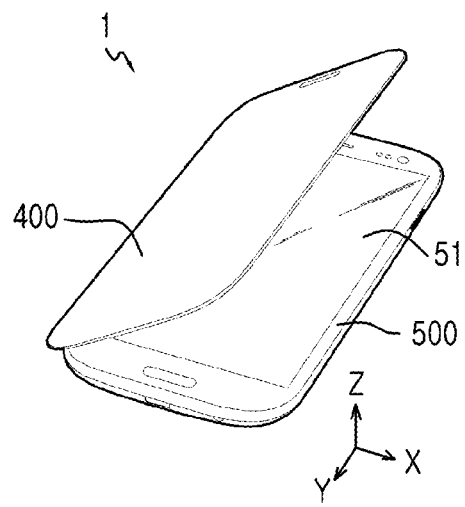
FIG. 11A is a perspective view of the electronic device.
Figure 11B:
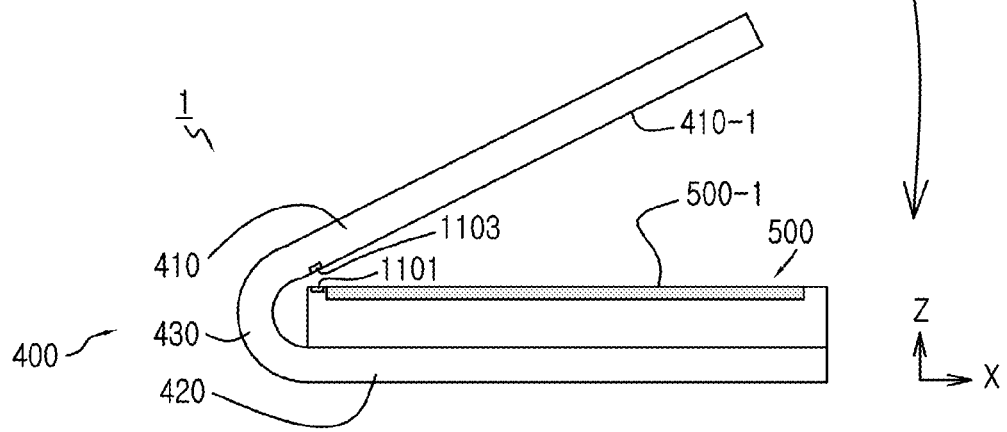
FIG. 11B is a side view of the electronic device, according to an embodiment of the present invention.

FIG. 11A is a perspective view of the electronic device 1, and FIG. 11B is a side view of the electronic device 1, according to an embodiment of the present invention.

Referring to FIGS. 11A and 11B, the main body 500 includes a Hall sensor 1101 (e.g., the Hall sensor 240I) on the same side 500-1 of the display 51. The first cover part 410 of the cover 400 includes a magnetic material 1103 (e.g., a magnet) in one side 410-1. When the Hall sensor 1101 detects the magnet 1103, the main body 500 determines the closing of the first cover part 410. When the Hall sensor 1101 does not detect the magnet 1103, the main body 500 determines the opening (e.g., the opening at 180 degrees or 360 degrees) of the first cover part 410.

Figure 12:
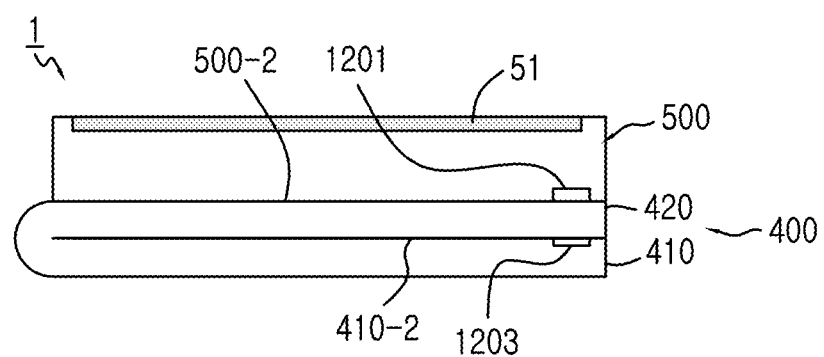
FIG. 12 is a side view of the electronic device, according to an embodiment of the present invention.

FIG. 12 is a side view of an electronic device 1, according to an embodiment of the present invention.

Referring to FIG. 12, the main body 500 includes a Hall sensor 1201 on the side 500-2 (e.g., the side where the second cover part 420 is attached) opposite to the side 500-1 of the display 51. The first cover part 410 of the cover 400 includes a magnet 1203 in the side 410-2. When the Hall sensor 1201 detects the magnet 1203, the main body 500 determines that the first cover part 410 is opened and overlapped with (e.g., opened 360 degrees) the main body 500. When the Hall sensor 1201 does not detect the magnet 1203, the main body 500 determines that the first cover part 410 is not completely opened (e.g., opened 180 degrees) or is closed.

Although not illustrated, the opening/closing position of the cover 400 may be determined by combining the structure of FIG. 11 and the structure of FIG. 12.

Figure 13:
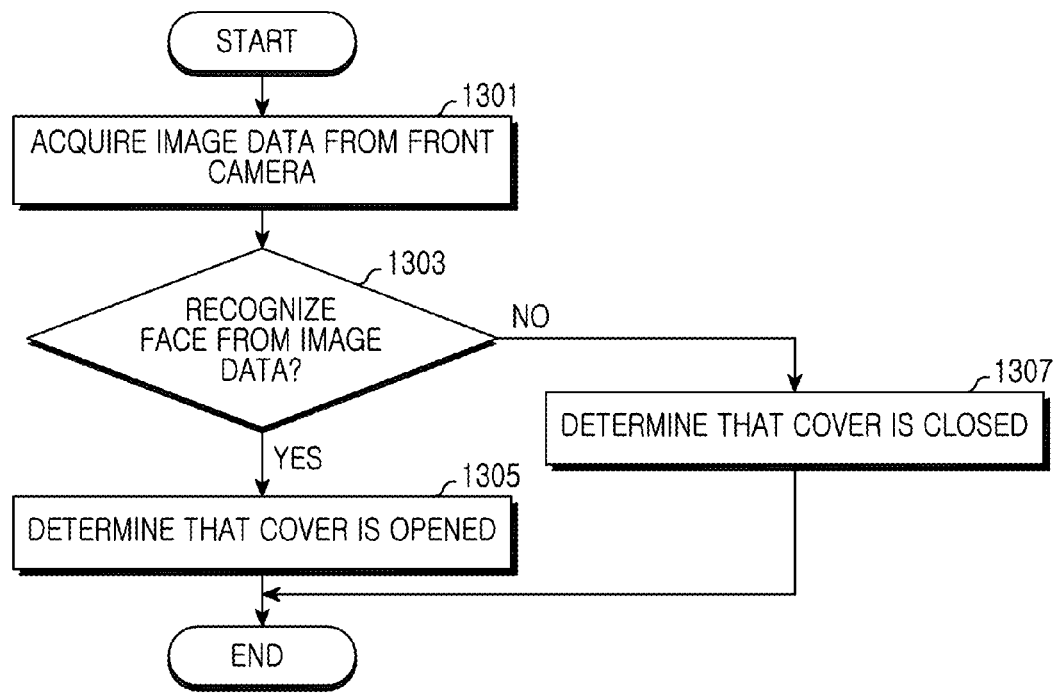
FIG. 13 is a flowchart illustrating a method for determining a position of the cover, according to an embodiment of the present invention.

FIG. 13 is a flowchart illustrating a method for determining the position of the cover 400, according to an embodiment of the present invention.

Referring to FIG. 13, at step 1301, the processor 211 (e.g., the acquisition module 910) acquires image data of the subject from the front camera 504. At step 1303, the processor 211 (e.g., the position determination module 903) determines whether the face is recognized from the image data. When recognizing the face from the image data, the processor 211 (e.g., the position determination module 903) determines the opening (e.g., the opening at 180 degrees or 360 degrees) of the cover (e.g. the first cover part 410) at step 1305. When not recognizing the face from the image data, the processor 211 (e.g., the position determination module 903) may determine the closing of the cover 400 at step 1307.

Figure 14:
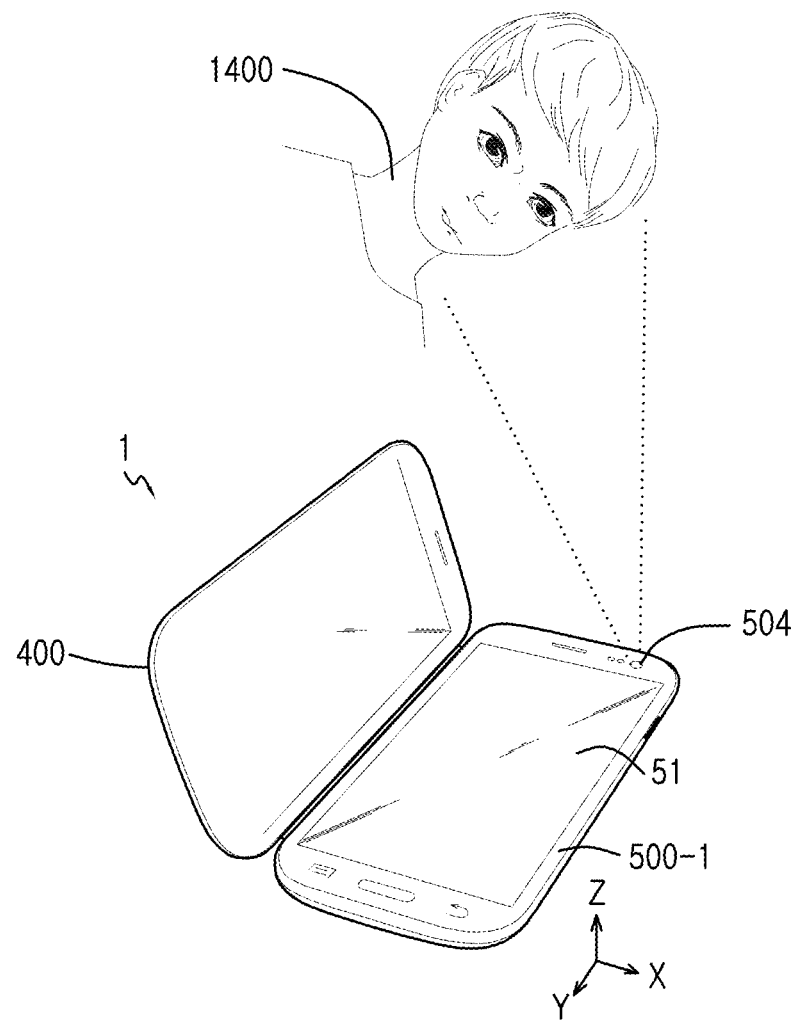
FIG. 14 is a perspective view of the electronic device, according to an embodiment of the present invention.

FIG. 14 is a perspective view of the electronic device 1, according to an embodiment of the present invention.

Referring to FIG. 14, the main body 500 includes the camera 504 on the same side 500-1 as the display 51. The camera 504 captures a subject 1400 and acquires the image data. The main body 500 recognizes the face from the image data fed from the camera 504 and determines the opening (e.g., the opening at 180 degrees or 360 degrees) of the first cover part 410 of the cover 400.

The electronic device may also use a rear side 500-2 of the main body 500.

Figure 15:
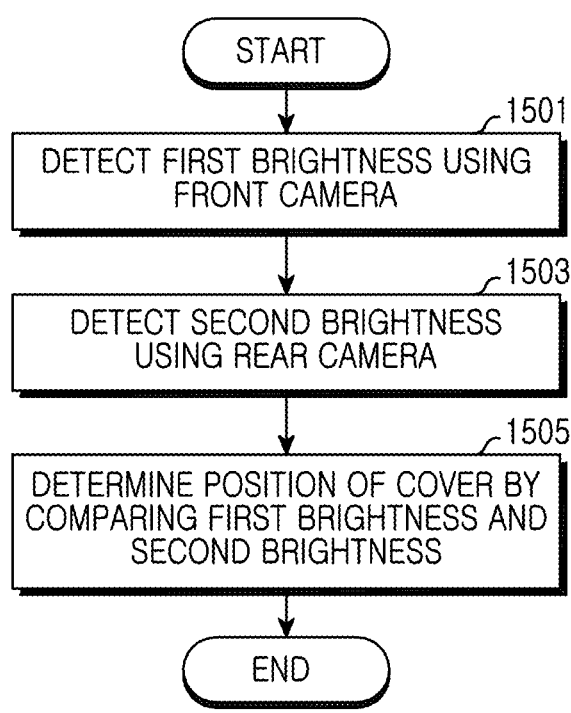
FIG. 15 is a flowchart illustrating a method for determining the position of the cover, according to an embodiment of the present invention.

FIG. 15 is a flowchart illustrating a method for determining the position of the cover 400, according to an embodiment of the present invention.

Referring to FIG. 15, at step 1501, the processor 211 (e.g., the acquisition module 910) detects a first brightness using the front camera 504. At step 1503, the processor 211 (e.g., the acquisition module 910) detects a second brightness using the rear camera 522. At step 1505, the processor 211 (e.g., the acquisition module 910) compares the first brightness and the second brightness and determines a position of the cover 400 (e.g., the first cover part 410) according to the comparison result.

Figure 16:
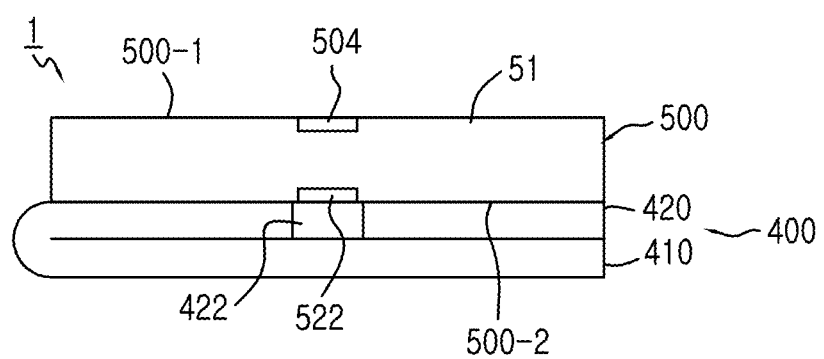
FIG. 16 is a side view of the electronic device, according to an embodiment of the present invention.

FIG. 16 is a side view of the electronic device 1, according to an exemplary embodiment of the present invention.

Referring to FIG. 16, the first cover part 410 of the cover 400 may be completely opened (e.g., opened 360 degrees) and cover the rear cover 522 at the rear side 500-2 of the main body 500. Accordingly, the front camera 504 at the front side 500-1 of the main body 500 receives the relatively brighter light than the rear camera 522, and the main body 500 determines that the first cover part 410 is closed.

Although it is not depicted, the electronic device compares the two brightnesses from the front camera 504 and the rear camera 522 and determines the other position (the closing, the opening while overlapping the main body 500, and the opening without overlapping the main body 500) of the first cover part 410 according to the comparison result.

Figure 17:
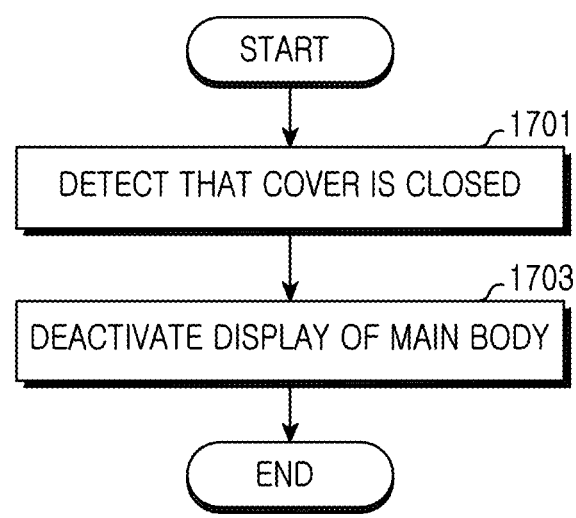
FIGS. 17-19 are flowcharts illustrating methods for controlling the display, according to an embodiment of the present invention.

FIG. 17 is a flowchart illustrating a method for controlling the display, according to an embodiment of the present invention.

Referring to FIG. 17, at step 1701, the processor 211 (e.g., the position determination module 903) detects the closed cover (e.g., the first cover part 410). When the cover 410 is closed, the cover 410 may overlap the main body 500. At step 1703, the processor 211 (e.g., the control module 905) deactivates the display 51 of the main body 500.

Figure 18:
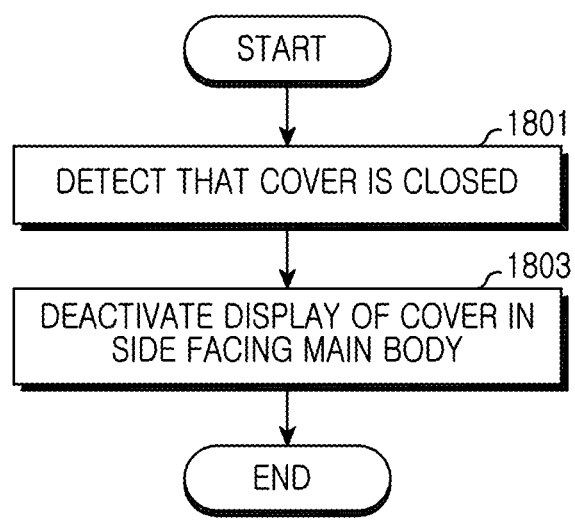

FIG. 18 is a flowchart illustrating a method for controlling the display, according to an exemplary embodiment of the present invention.

Referring to FIG. 18, at step 1801, the processor 211 (e.g., the position determination module 903) detects the closed cover (e.g., the first cover part 410). At step 1703, the processor 211 (e.g., the control module 905) deactivates the display 41 of the cover 410 in one side 410-1 (the unexposed side) facing the main body 500.

Figure 19:
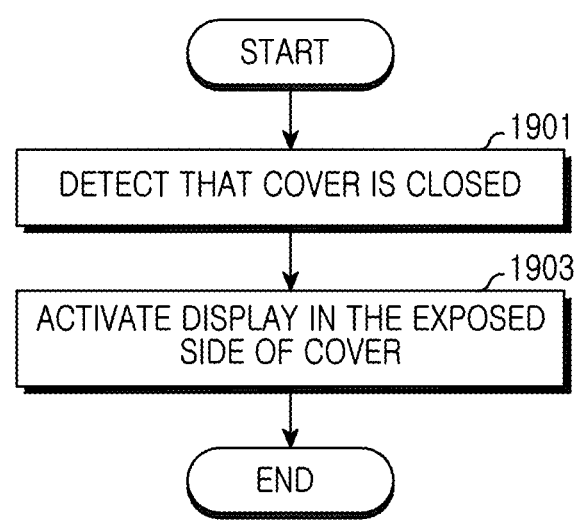

FIG. 19 is a flowchart illustrating a method for controlling the display, according to an exemplary embodiment of the present invention. Referring to FIG. 19, at step 1901, the processor 211 (e.g., the position determination module 903) detects the closed cover (e.g., the first cover part 410). At step 1903, the processor 211 (e.g., the control module 905) activates the display 41 in the exposed side of the cover part 410.

Figure 20A:
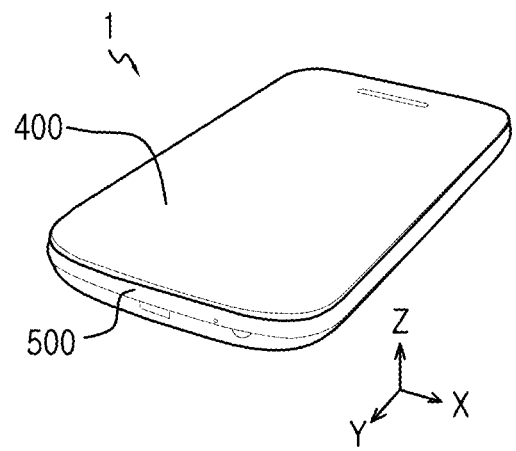
FIG. 20A is a perspective view of the electronic device.
Figure 20B:
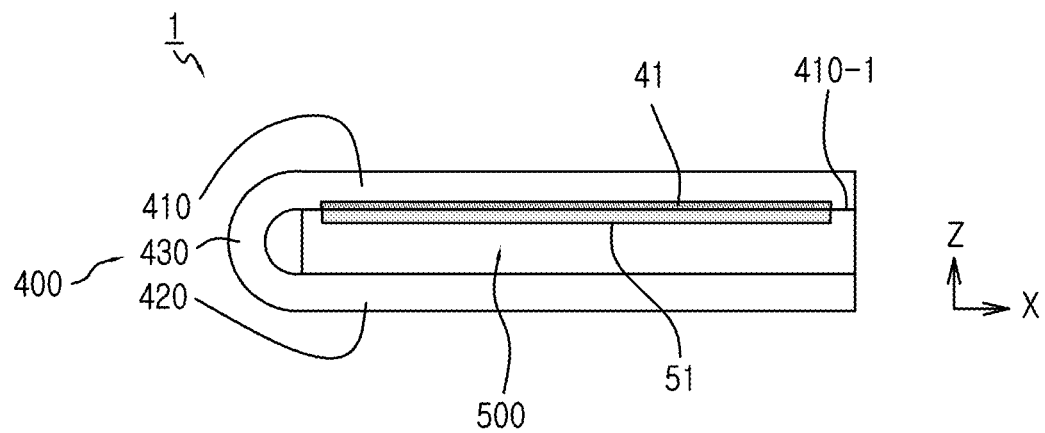
FIG. 20B is a side view of the electronic device, according to an embodiment of the present invention.

FIG. 20A is a perspective view of the electronic device 1, and FIG. 20B is a side view of the electronic device 1, according to an embodiment of the present invention.

Referring to FIGS. 20A and 20B, the first cover part 410 of the cover 400 may be closed to hide the main display 51 of the main body 500. Herein, the main body 500 may deactivate the main display 51. The main body 500 may deactivate the sub-display 41 of the cover 410 in one side 410-1 facing the main display 51.

Figure 21A:
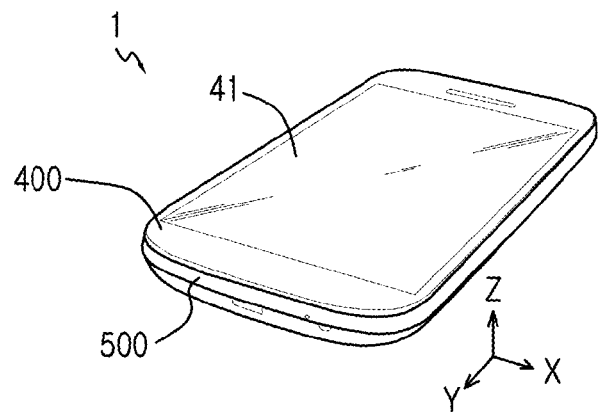
FIG. 21A is a perspective view of the electronic device.
Figure 21B:
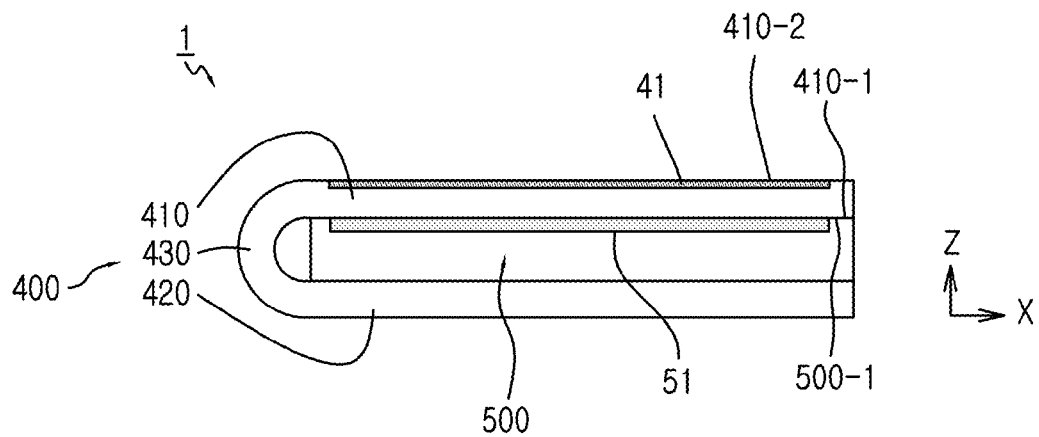
FIG. 21B is a side view of the electronic device, according to an embodiment of the present invention.

FIG. 21A is a perspective view of the electronic device 1 and FIG. 21B is a side view of the electronic device 1, according to an embodiment of the present invention.

Referring to FIGS. 21A and 21B, the first cover part 410 of the cover 400 may be closed to hide the main display 51 of the main body 500. The main body 500 may deactivate the main display 51. The main body 500 may activate the sub-display 41 in the exposed side 410-2 (the opposite side of the side 410-1 facing the main display 51) of the cover 410.

Figure 22:
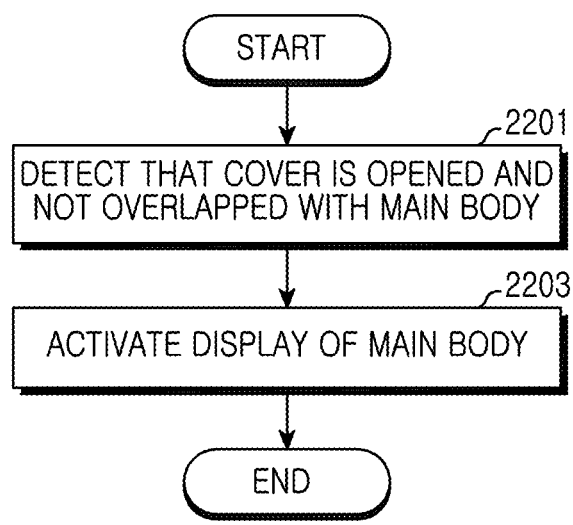
FIGS. 22 and 23 are flowcharts illustrating methods for controlling the display, according to an embodiment of the present invention.

FIG. 22 is a flowchart illustrating a method for controlling the display, according to an embodiment of the present invention.

Referring to FIG. 22, at step 2201, the processor 211 (e.g., the position determination module 903) detects that the cover 400 (e.g., the first cover part 410) is opened and not overlapped (e.g., opened 180 degrees) with the main body 500. At step 2203, the processor 211 (e.g., the control module 905) activates the display 51 of the main body 500.

Figure 23:
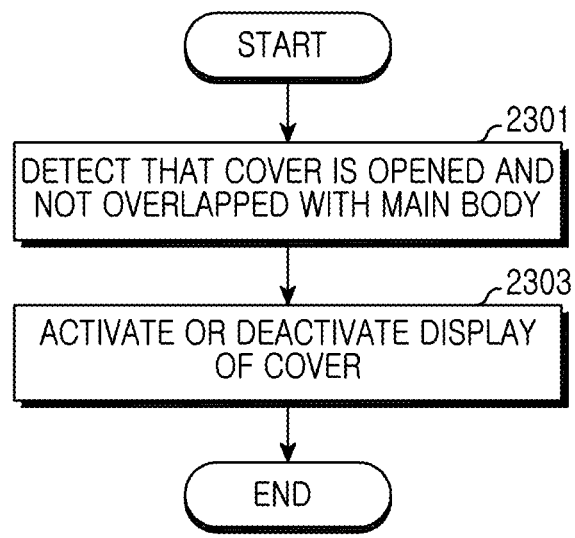
Figure 24A:
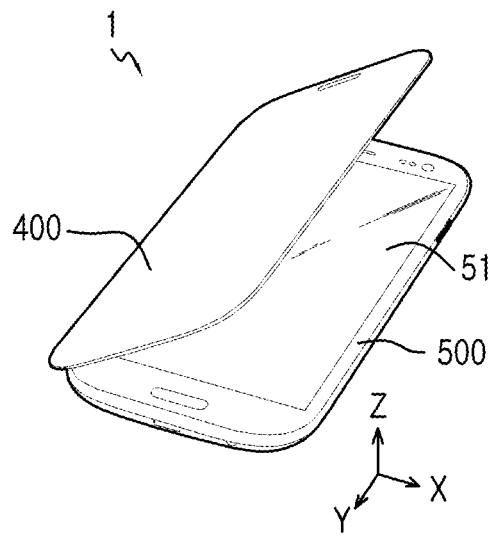
FIGS. 24A, 25A, 26A, and 27A are perspective views of the electronic device.
Figure 24B:
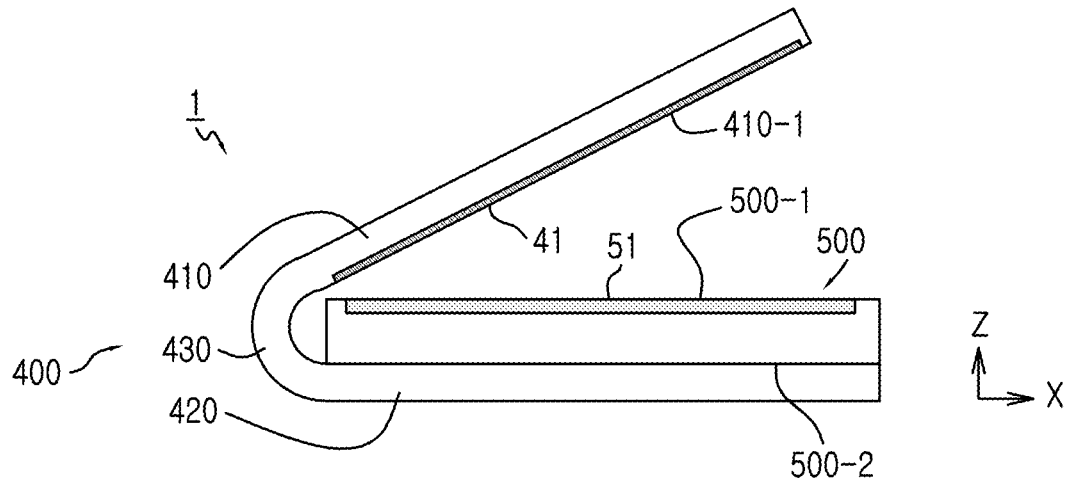
FIGS. 24B, 25B, 26B, and 27B are side views of the electronic device, respectively, according to an embodiment of the present invention.
Figure 25A:
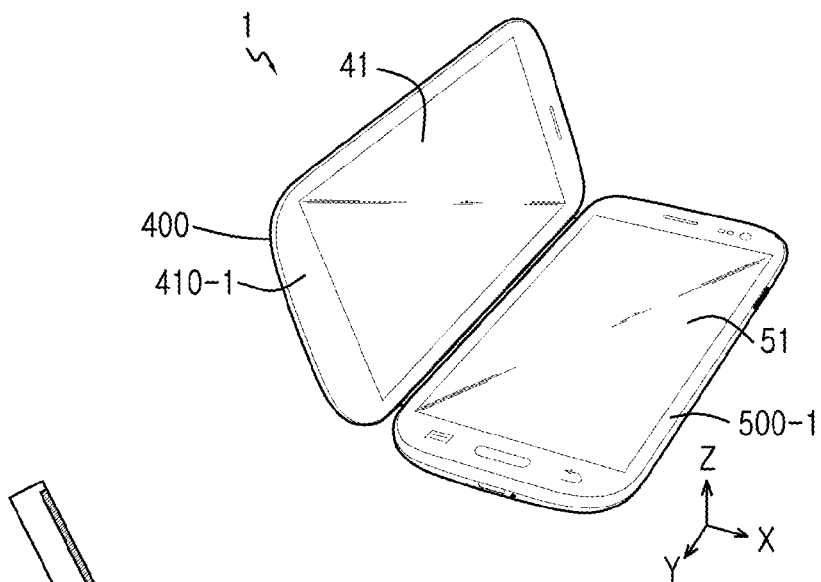
Figure 25B:
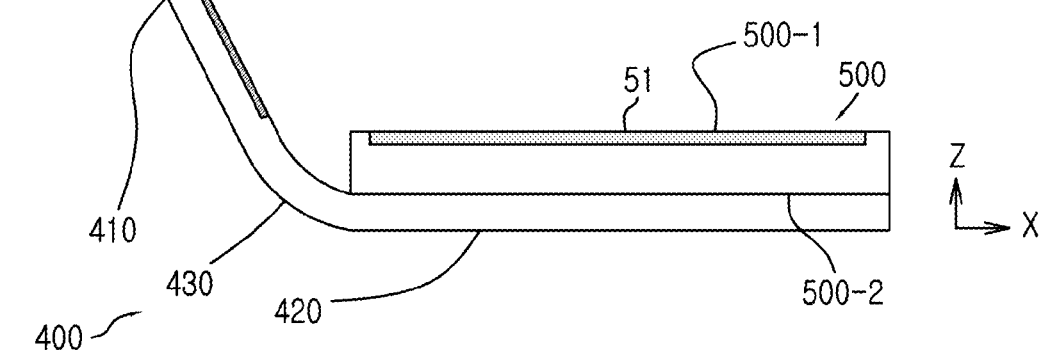
Figure 26A:
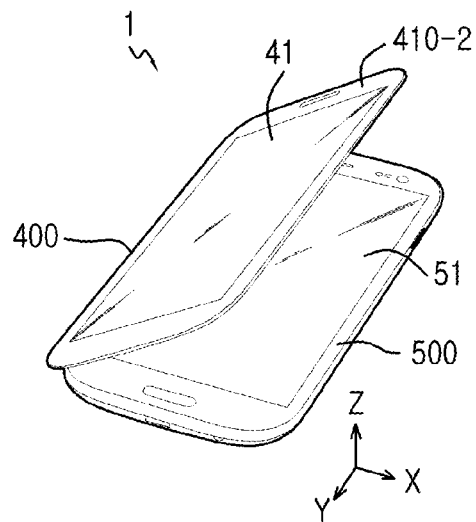
Figure 26B:
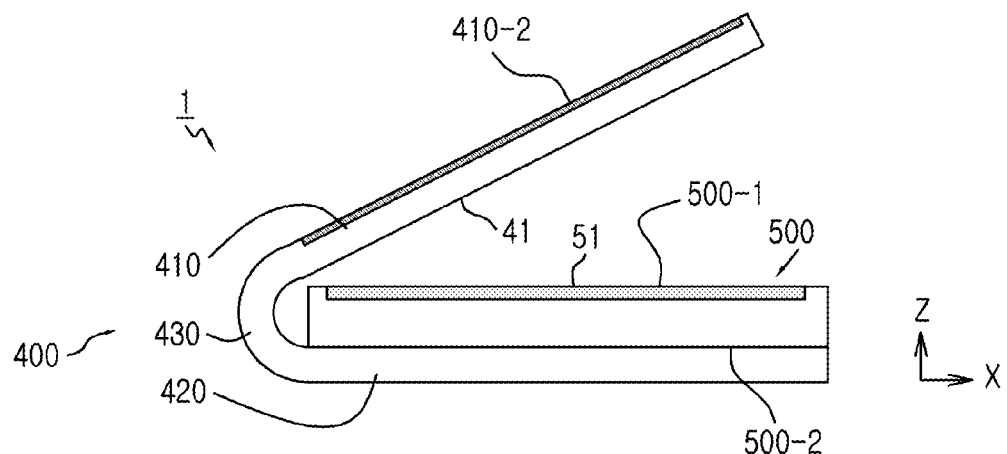
Figure 27A:
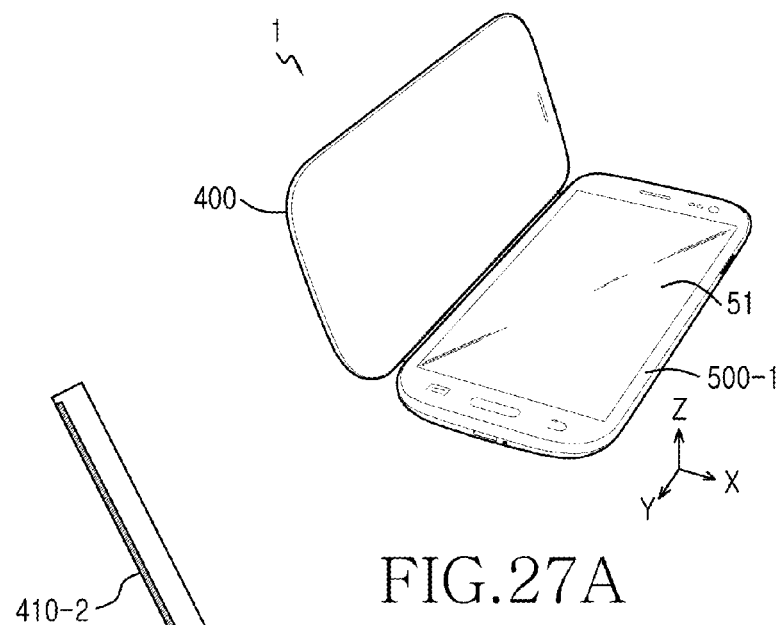
Figure 27B:
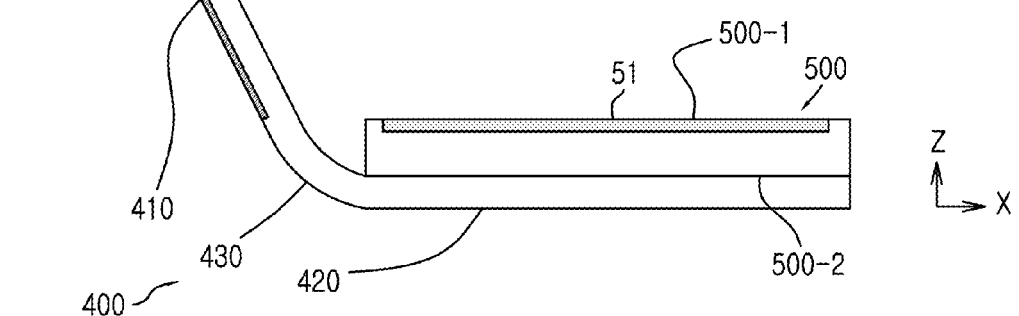

FIG. 23 is a flowchart illustrating a method for controlling the display, according to an embodiment of the present invention.

Referring to FIG. 23, at step 2301, the processor 211 (e.g., the position determination module 903) detects that the cover 400 (e.g., the first cover part 410) is opened and not overlapped (e.g., opened 180 degrees) with the main body 500. At step 2303, the processor 211 (e.g., the control module 905) activates or deactivates the display 41 of the cover 400.

FIGS. 24A, 25A, 26A, and 27A are perspective views of the electronic device 1, and FIGS. 24B, 25B, 26B, and 27B are side views of the electronic device 1, respectively, according to an embodiment of the present invention.

Referring to FIGS. 24A through 27B, the first cover part 410 of the cover 400 may be opened and not overlapped with the main body 500 (e.g., opened 180 degrees). The main body 500 may activate the main display 51. The main body 500 may activate or deactivate the display 41 in one of the opposite sides 410-1 and 410-2 of the cover 400.

Figure 28:
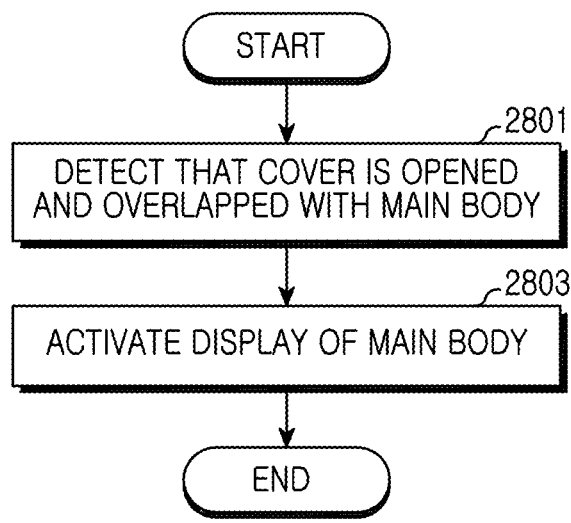
FIGS. 28 through 30 are flowcharts illustrating methods for controlling the display, according to an embodiment of the present invention.

FIG. 28 is a flowchart illustrating a method for controlling the display, according to an embodiment of the present invention.

Referring to FIG. 28, at step 2801, the processor 211 (e.g., the position determination module 903) detects that the cover 400 (e.g., the first cover part 410) is opened and overlapped (e.g., opened 360 degrees or opened completely) with the main body 500. At step 2803, the processor 211 (e.g., the control module 905) activates the display 51 of the main body 500.

Figure 29:
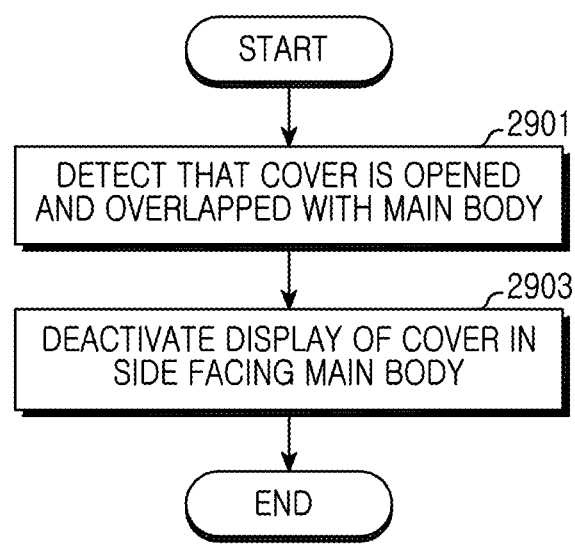

FIG. 29 is a flowchart illustrating a method for controlling the display, according to an embodiment of the present invention.

Referring to FIG. 29, at step 2901, the processor 211 (e.g., the position determination module 903) detects that the cover (e.g., the first cover part 410) is opened and overlapped (e.g., opened 360 degrees) with the main body 500. At step 2903, the processor 211 (e.g., the control module 905) deactivates the display 51 of the cover 400 in the side 410-2 facing the main body 500.

Figure 30:
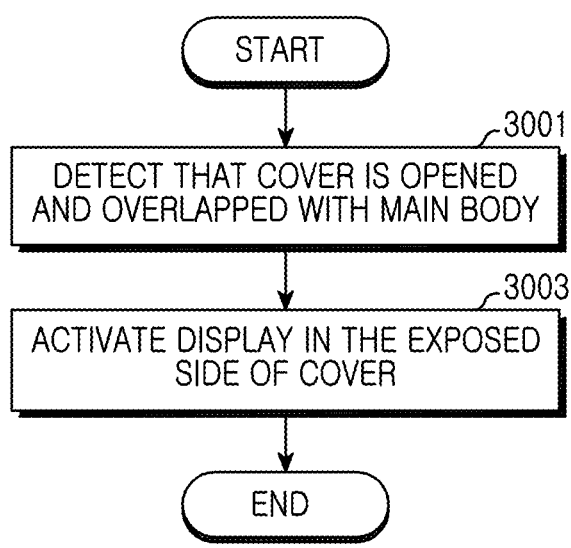

FIG. 30 is a flowchart illustrating a method for controlling the display, according to an embodiment of the present invention.

Referring to FIG. 30, at step 3001, the processor 211 (e.g., the position determination module 903) detects that the cover (e.g., the first cover part 410) is opened and overlapped (e.g., opened 360 degrees) with the main body 500. At step 3003, the processor 211 (e.g., the control module 905) activates the display 41 in the exposed side of the cover 400.

Figure 31:
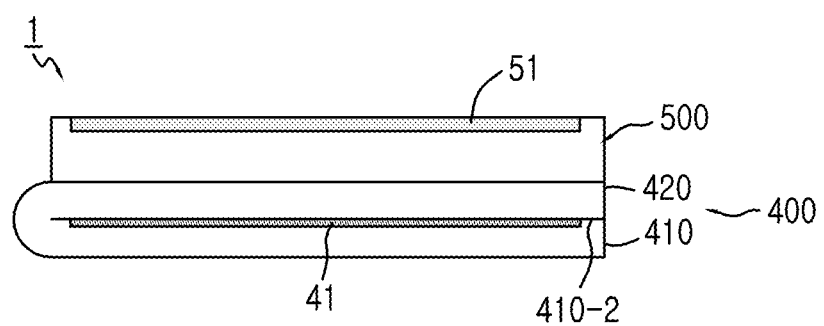
FIGS. 31 and 32 are side views of the electronic device, according to an embodiment of the present invention.
Figure 32:
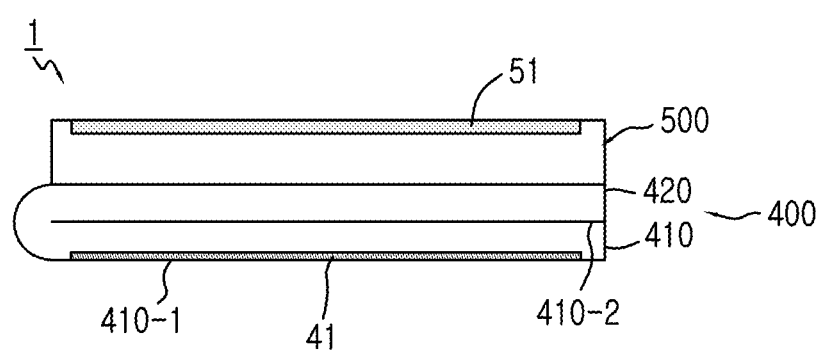

FIGS. 31 and 32 are side views of the electronic device 1, according to an embodiment of the present invention.

Referring to FIG. 31, the first cover part 410 of the cover 400 may be opened and overlapped (e.g., opened 360 degrees) with the main body 500. The main body 500 may activate the main display 51. The main body 500 may deactivate the sub-display 41 of the cover 400 in the side 410-2 facing the main display 51.

Referring to FIG. 32, the first cover part 410 of the cover 400 may be opened and overlapped with the main body 500. The main body 500 may activate the main display 51. The main body 500 may activate the sub-display 41 in the exposed side 410-1 (the opposite side of the side 410-2 facing the main display 51) of the first cover part 410.

Figure 33:
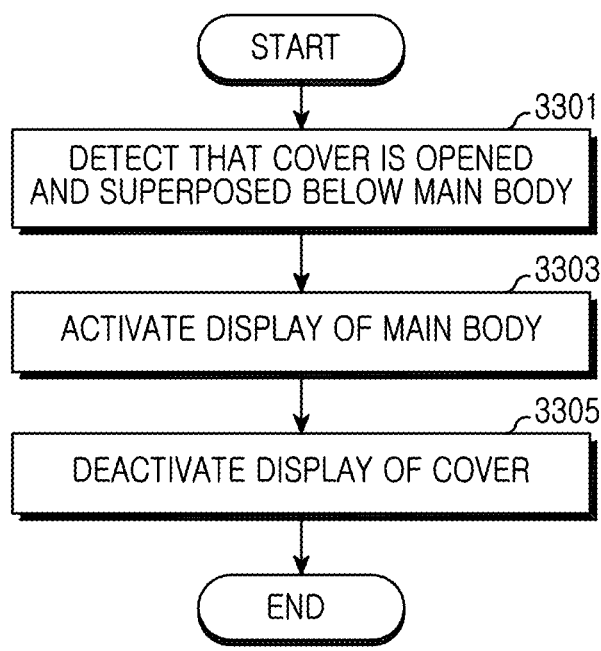
FIGS. 33 and 34 are flowcharts illustrating methods for controlling the display, according to an embodiment of the present invention.

FIG. 33 is a flowchart illustrating a method for controlling the display, according to an embodiment of the present invention.

Referring to FIG. 33, at step 3301, the processor 211 (e.g., the position determination module 903) detects that the cover 400 (e.g., the first cover part 410) is opened and superposed beneath the main body 500. At step 3303, the processor 211 (e.g., the control module 905) activates the display 51 of the main body 500. At step 3305, the processor 211 (e.g., the control module 905) deactivates the display 41 of the first cover part 410.

Figure 34:
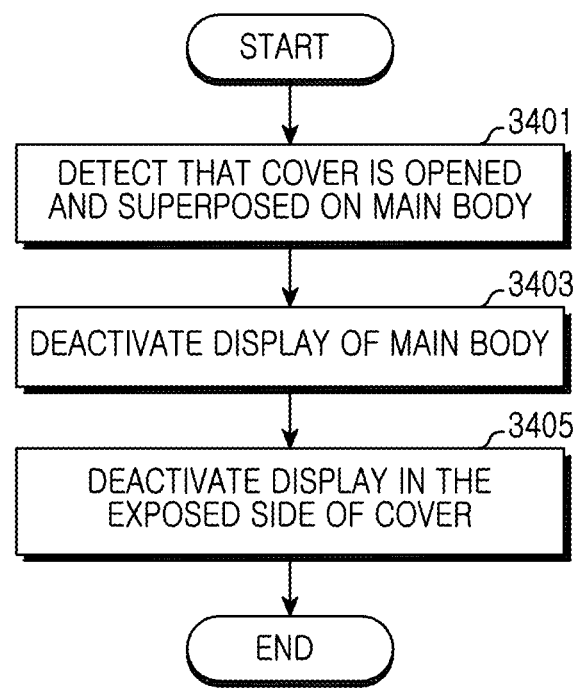

FIG. 34 is a flowchart illustrating a method for controlling the display, according to an embodiment of the present invention.

Referring to FIG. 34, at step 3401, the processor 211 (e.g., the position determination module 903) detects that the cover 400 (e.g., the first cover part 410) is opened and superposed on the main body 500. At step 3403, the processor 211 (e.g., the control module 905) deactivates the display 51 of the main body 500. At step 3405, the processor 211 (e.g., the control module 905) activates the display 41 of the exposed side of the cover 400.

Figure 35:
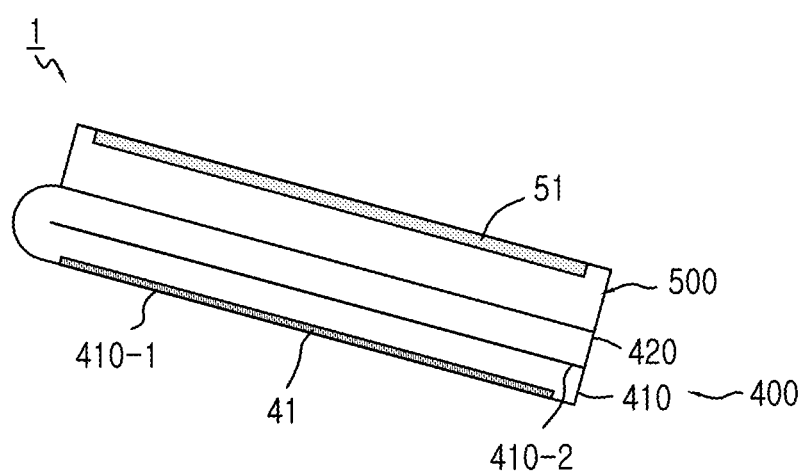
FIGS. 35 and 36 are side views of the electronic device, according to an embodiment of the present invention.
Figure 36:
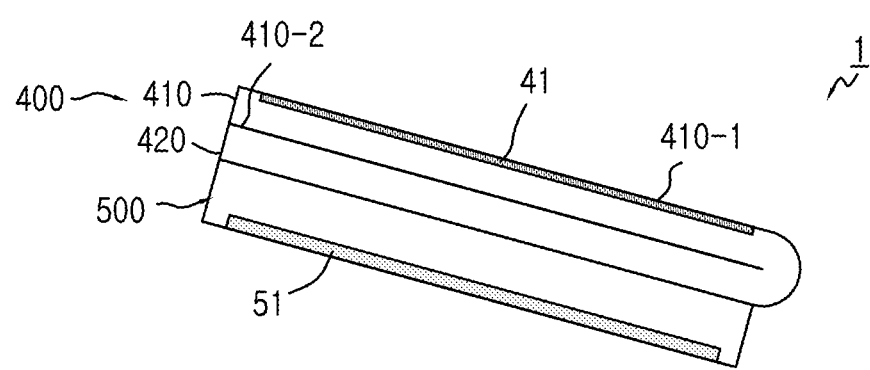

FIGS. 35 and 36 are side views of the electronic device 1, according to an embodiment of the present invention.

Referring to FIG. 35, the first cover part 410 of the cover 400 may be opened and superposed beneath the main body 500. The main body 500 may activate the main display 51. The main body 500 may deactivate the sub-display 41 of the cover 400.

Referring to FIG. 36, the first cover part 410 of the cover 400 may be opened and superposed on the main body 500. The main body 500 may deactivate the main display 51. The main body 500 may activate the sub-display 41 of the cover 400 in the exposed side 410-1 (the opposite side of the side 410-2 facing the main body 500) of the first cover part 410.

Figure 37:
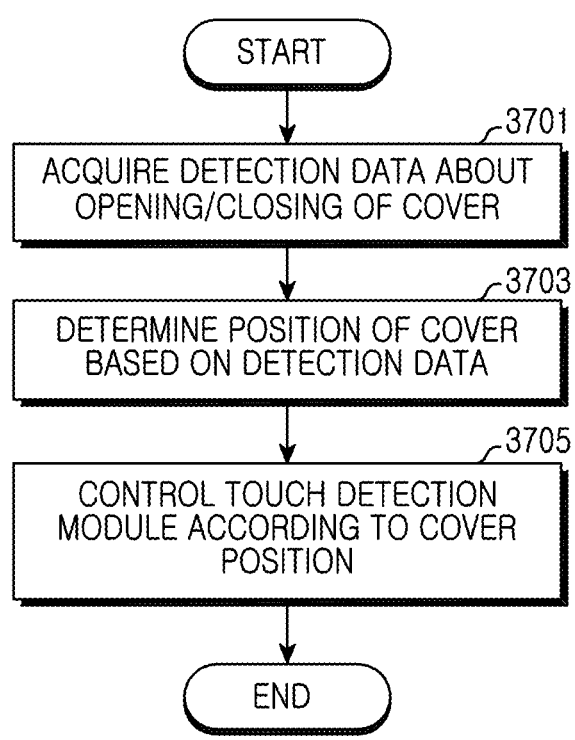
FIG. 37 is a flowchart illustrating a method for controlling a touch detection module, according to an embodiment of the present invention.

FIG. 37 is a flowchart illustrating a method for controlling the touch detection module, according to an embodiment of the present invention.

Referring to FIG. 37, at step 3701, the processor 211 (e.g., the acquisition module 910) acquires the detection data relating to the opening/closing of the cover 400 (e.g., the first cover part 410). At step 3703, the processor 211 (e.g., the position determination module 903) determines the position of the cover 400 based on the detection data. At step 3705, the processor 211 (e.g., the control module 905) controls the touch detection module (e.g., the touch panel 252 or the pen sensor 254) according to the position of the cover 400. For example, the processor 211 (e.g., the control module 905) activates or deactivates the touch detection module. Also, the processor 211 (e.g., the control module 905) regulates touch detection capacitance of the touch detection module. The processor 211 also regulates touch recognition sensitivity (touch sensitivity) of the touch detection module. For example, when the touch recognition sensitivity is relatively high, the touch detection module recognizes the touch even with the small capacitance change.

Figure 38:
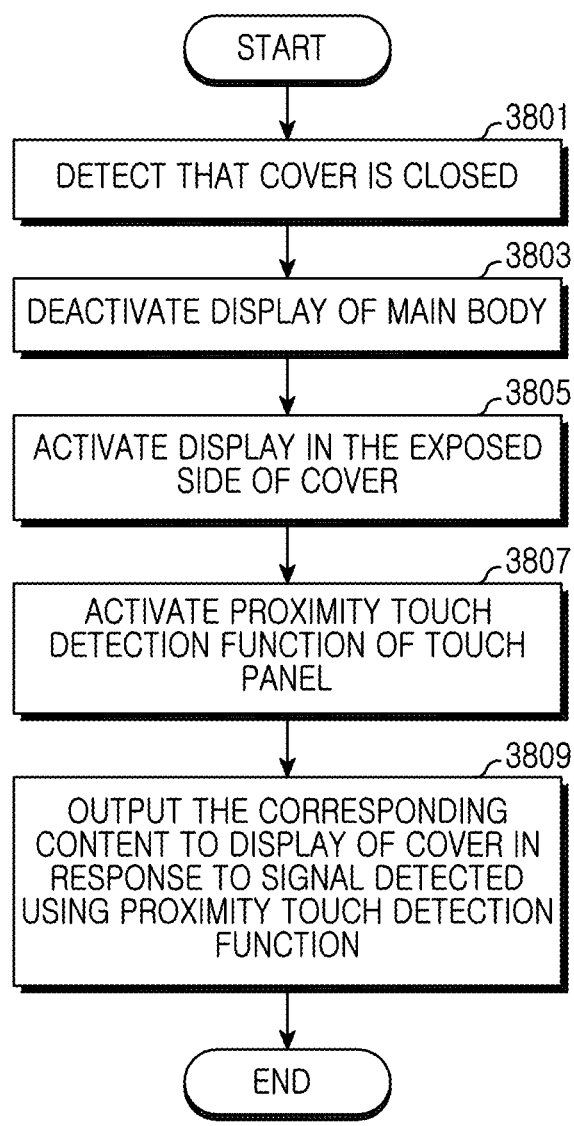
FIG. 38 is a flowchart illustrating an input/output control method, according to an embodiment of the present invention.

FIG. 38 is a flowchart illustrating an input/output control method, according to an embodiment of the present invention.

Referring to FIG. 38, at step 3801, the processor 211 (e.g., the position determination module 903) detects that the cover 400 (e.g., the first cover part 410) is closed and overlapped with the main body 500. At step 3803, the processor 211 (e.g., the control module 905) deactivates the display 51 of the main body 500. At step 3805, the processor 211 (e.g., the control module 905) activates the display 41 in the exposed side of the cover 410. At step 3807, the processor 211 (e.g., the control module 905) activates a proximity touch detection function (or a non-contact touch detection function) (e.g., hovering) of the touch detection module (e.g., the touch panel 252 or the pen sensor 254). At step 3809, the processor 211 (e.g., the control module 905) outputs the corresponding content to the display 41 of the cover 410 in response to a touch (input) being detected using the proximity touch detection function.

Figure 39A:
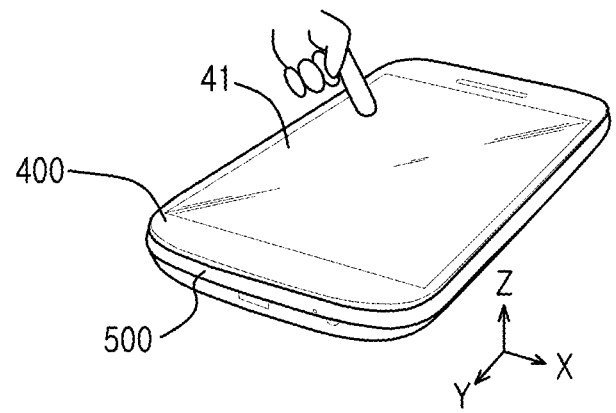
FIG. 39A is a perspective view of the electronic device.
Figure 39B:
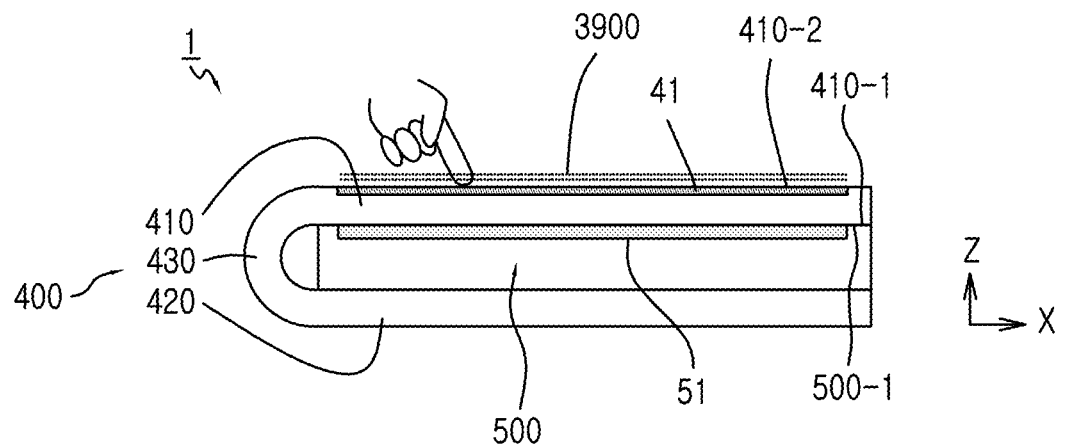
FIG. 39B is a side view of the electronic device, according to an embodiment of the present invention.

FIG. 39A is a perspective view of the electronic device 1, and FIG. 39B is a side view of the electronic device 1, according to an embodiment of the present invention.

Referring to FIGS. 39A and 39B, the first cover part 410 of the cover 400 may be closed. The main body 500 may deactivate the main display 51. The main body 500 may activate the sub-display 41 in the exposed side 410-2 of the first cover part 410. The main body 500 may activate the proximity touch detection function of the touch detection module (e.g., the touch panel 252 or the pen sensor 254). Herein, the touch detection module 252 or 254 generates an electromagnetic field (or the capacitance) 3900 above the surface of the display 41 of the first cover part 410. When a finger or the stylus touches the surface of the sub-display 41 of the cover 400, the capacitance may change. When the change of the capacitance reaches a preset threshold of the proximity touch detection function, the touch detection module or the processor 211 recognizes the touch.

Although it is not illustrated, when the first cover part 410 of the cover 400 is opened, the main body 500 deactivates the proximity touch detection function of the touch detection module (e.g., the touch panel 252 or the pen sensor 254) and activates the touch detection function using the main display 51.

Figure 40:
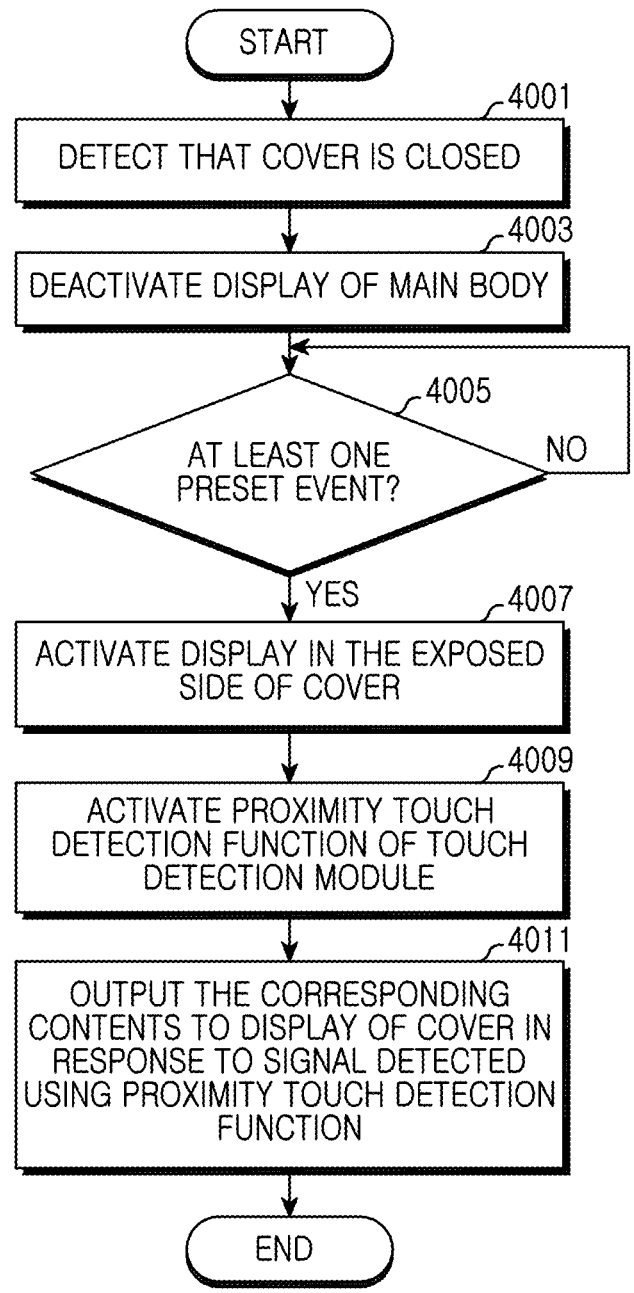
FIG. 40 is a flowchart illustrating an input/output control method, according to an embodiment of the present invention.

FIG. 40 is a flowchart illustrating an input/output control method, according to an embodiment of the present invention.

Referring to FIG. 40, at step 4001, the processor 211 (e.g., the position determination module 903) detects that the cover 400 (e.g., the first cover part 410) is closed. At step 4003, the processor 211 (e.g., the control module 905) deactivates the display 51 of the main body 500. At step 4005, the processor 211 (e.g., the control module 905) determines whether at least one preset event occurs. The at least one preset event may include a preset motion of the main body 500, push of a preset button, and separation of the stylus. For example, the processor 211 detects the preset motion (e.g., shake) of the electronic device 1 based on the detection data from at least one sensor (e.g., the gyro sensor 240D, the acceleration sensor 240E, the geomagnetic sensor 240F), and proceeds to step 4007. For example, the processor 211 detects the separation of the stylus 531 of FIG. 5 from at least one sensor (e.g., the stylus detector 240N) and proceeds to step 4007. At step 4007, the processor 211 (e.g., the control module 905) activates the display 41 in the exposed side of the cover 400. At step 4009, the processor 211 (e.g., the control module 905) activates the proximity touch detection function (e.g., hovering) of the touch detection module (e.g., the touch panel 252 or the pen sensor 254) of the main body 500. At step 4011, the processor 211 (e.g. the control module 905) outputs the corresponding content to the display 41 of the cover 400 in response to the touch detected using the proximity touch detection function.

Figure 41:
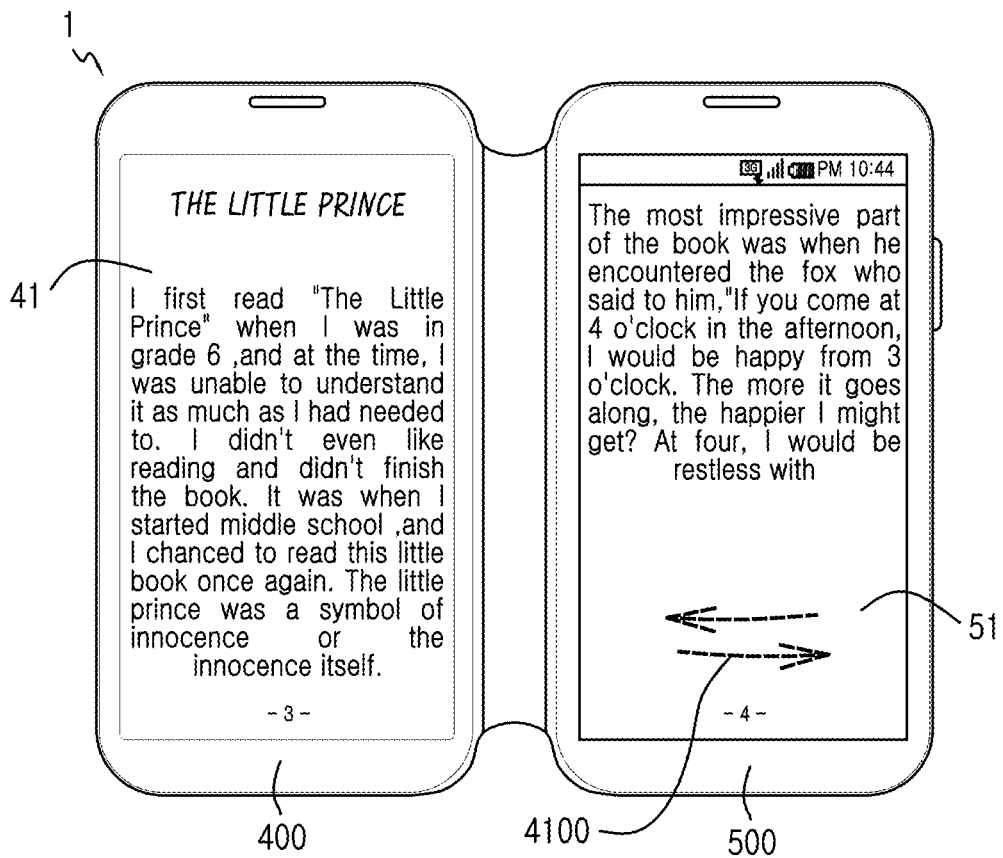
Figure 42:
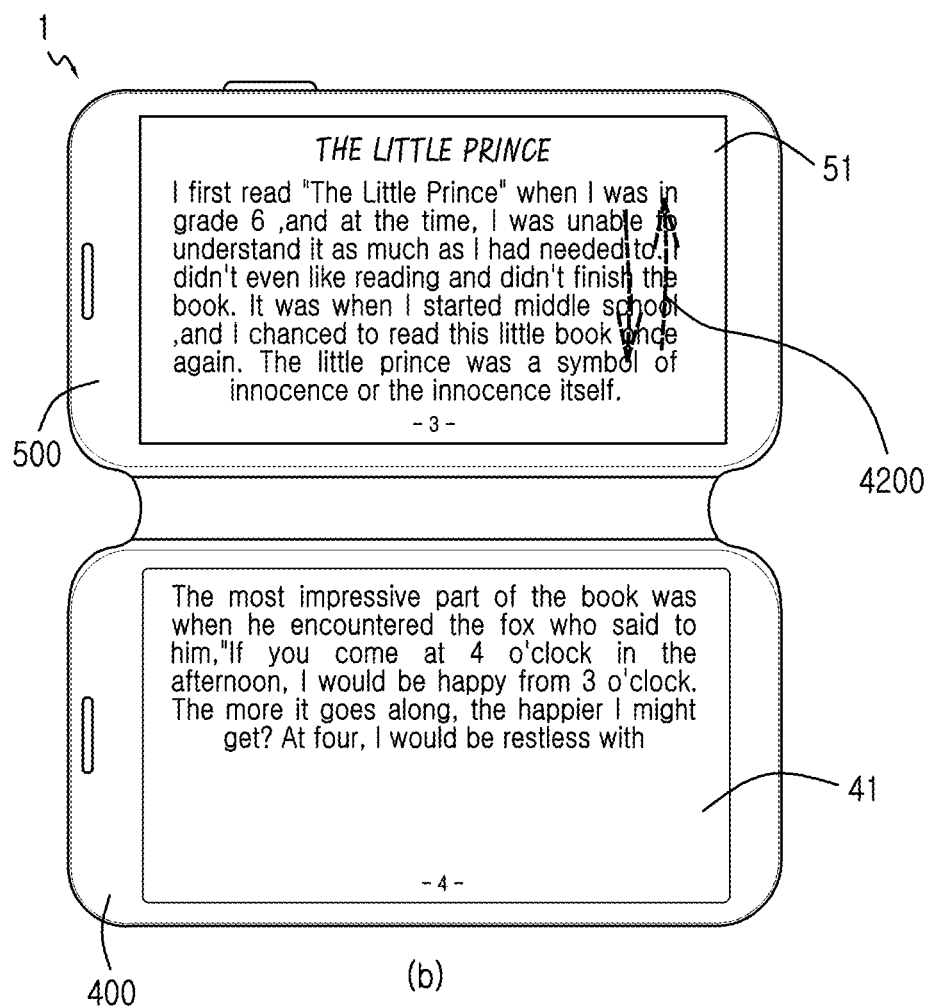

FIGS. 41 and 42 are diagrams of screen shots of the electronic device 1, according to an embodiment of the present invention.

Referring to FIG. 41, the cover 400 may be opened (e.g., opened 180 degrees), and the display 41 of the cover 400 and the touch screen 51 of the main body 500 may be disposed side by side. The electronic device 1 displays the content (e.g., an e-book, a webpage, etc.) using both of the touch screen 51 of the main body 500 and the display 41 of the cover 400. When the user horizontally flicks the touch screen 51 of the main body 500, the electronic device 1 switches the two displays 41 and 51 to a previous page or a next page.

Referring to FIG. 42, the cover 400 may be opened (e.g., opened 180 degrees), and the display 41 of the cover 400 and the touch screen 51 of the main body 500 may be switched from the portrait display (FIG. 41) to the landscape display. Herein, the content display may be also changed from the portrait mode to the landscape mode. When the user vertically flicks the touch screen 51 of the main body 500, the electronic device 1 switches the two displays 41 and 51 to a previous page or a next page.

Figure 43:
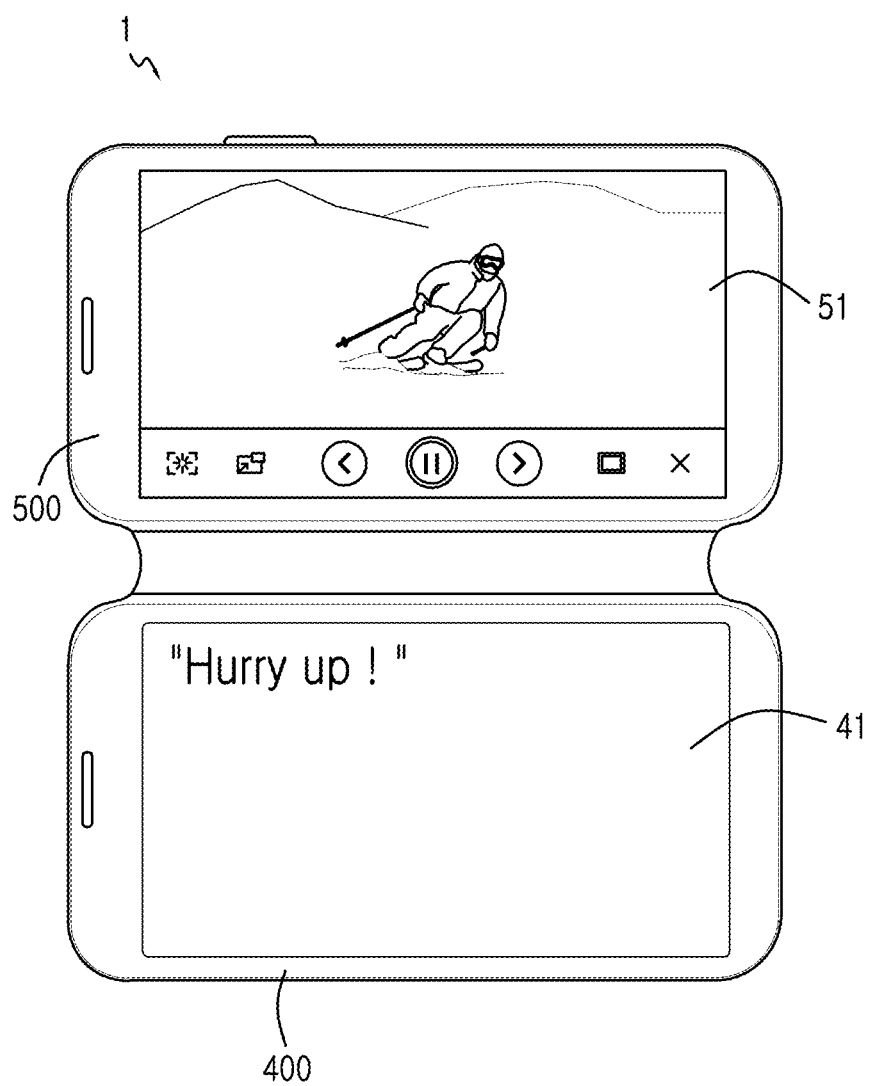

FIG. 43 is a diagram of a screen shot of the electronic device 1, according to an embodiment of the present invention.

Referring to FIG. 43, the cover 400 may be opened (e.g., opened 180 degrees), and the display 41 of the cover 400 and the display 51 of the main body 500 may be disposed up and down. The electronic device 1 divides the content display to the two displays 41 and 51. For example, the display 51 of the main body 500 may display a video and the display 41 of the cover 400 may display a subtitle. The content display of FIGS. 41 and 42 may be divided to the two displays 41 and 51.

Although not shown, when multitasking a plurality of applications, the electronic device 1 divides and displays the applications to the display 51 of the main body 500 and the display 41 of the cover 400.

FIGS. 44A and 44B are diagrams of a screen shot of the electronic device 1, according to an embodiment of the present invention.

Referring to FIGS. 44A and 44B, when the cover 400 is opened, the electronic device 1 displays the content in the display 51 of the main body 500. When the cover 400 is closed, the electronic device 1 switches the content display to the display 41 on the surface of the cover 400.

Figure 45:
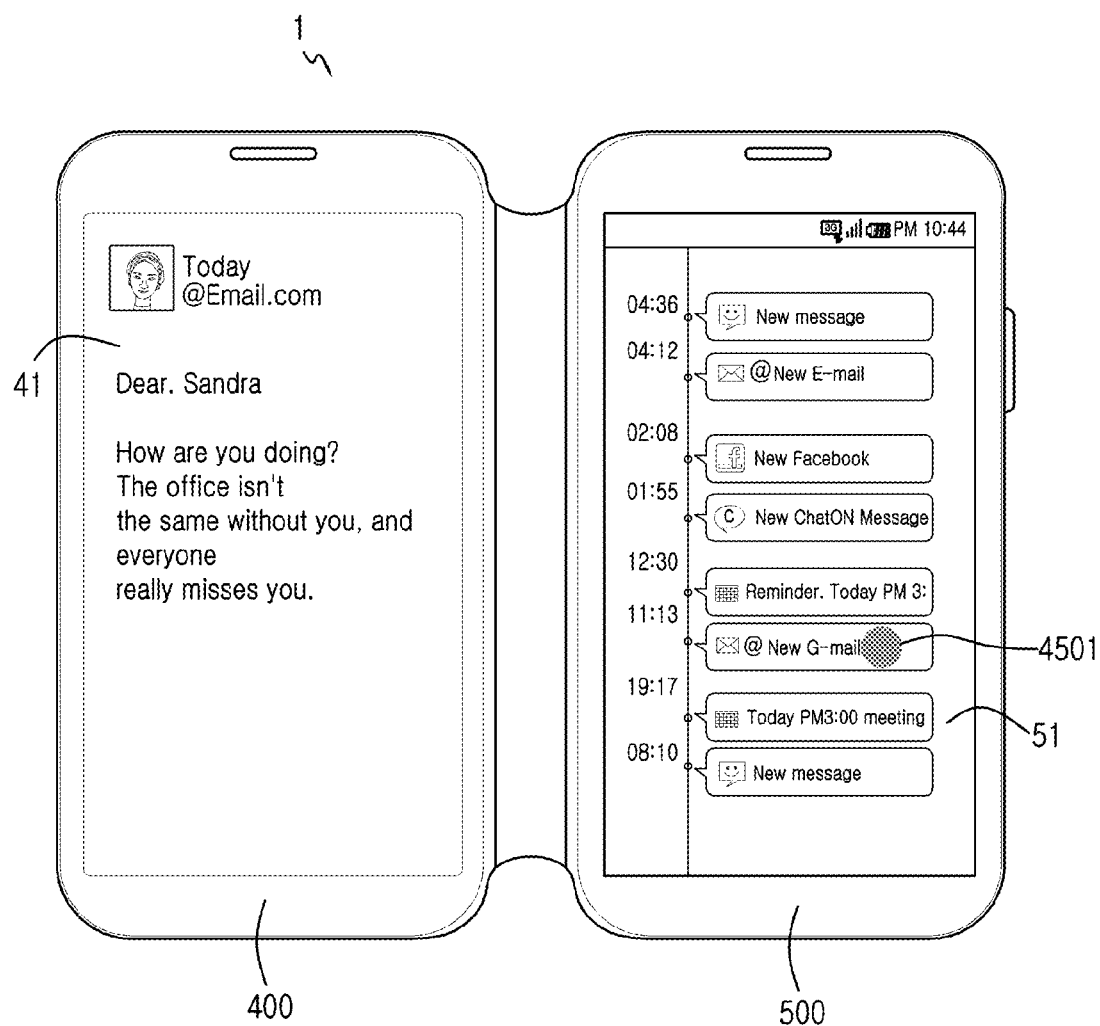

FIG. 45 is a diagram of a screen shot of the electronic device 1, according to an embodiment of the present invention.

Referring to FIG. 45, the cover 400 may be opened (e.g., opened 180 degrees), and the display 41 of the cover 400 and the touch screen 51 of the main body 500 may be disposed side by side. The electronic device 1 displays subcontent of an item 4501 (e.g., e-mail) touched by the user in the content displayed in the touch screen 51 of the main body 500, in the display 41 of the cover 400.

Figure 46:
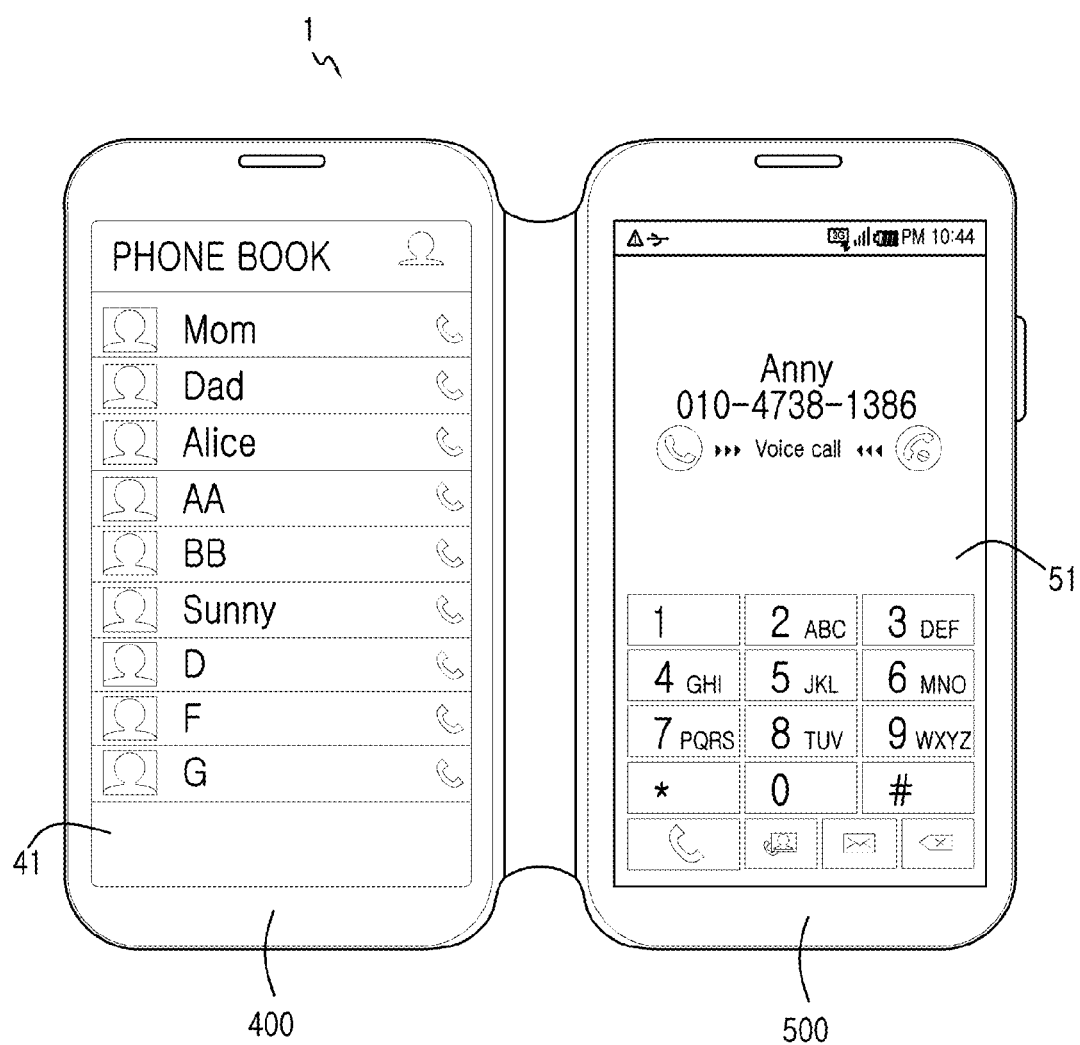

FIG. 46 is a diagram of a screen shot of the electronic device 1, according to an embodiment of the present invention.

Referring to FIG. 46, the cover 400 may be opened (e.g., opened 180 degrees), and the display 41 of the cover 400 and the display 51 of the main body 500 may be disposed side by side. The electronic device 1 displays a related content in the two displays 41 and 51 respectively. For example, the display 51 of the main body 500 displays a call content, and the display 41 of the cover 400 displays a phonebook. Although it is not depicted, other various embodiments may be realized.

Figure 47A:
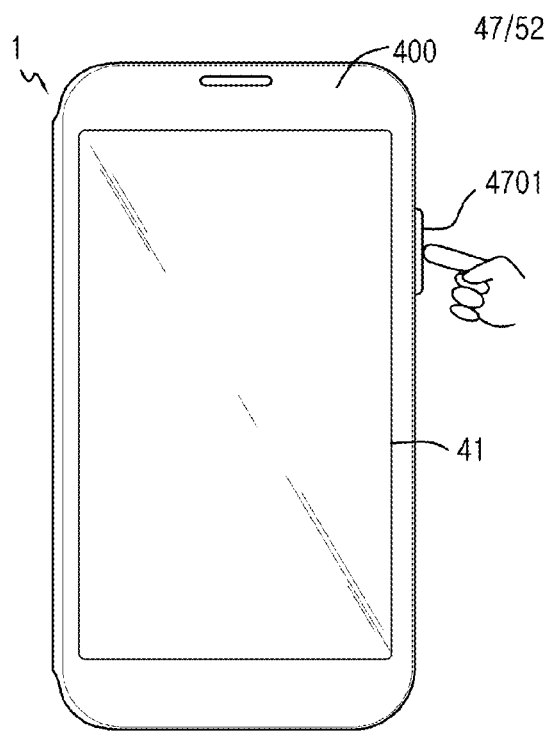
Figures 47B, 47C:
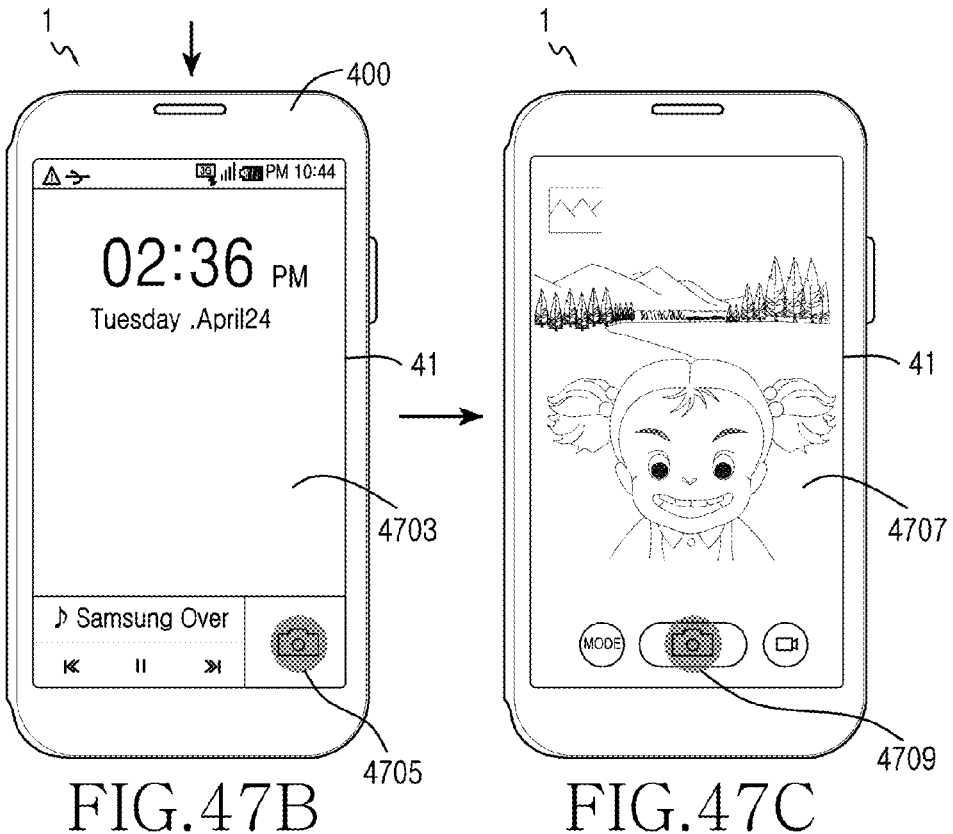

FIGS. 47A-47C are diagrams of screen shots of the electronic device 1, according to an embodiment of the present invention. When the cover 400 is closed, the electronic device 1 activates the display 41 on the surface of the cover 400 and activates the proximity touch detection function (the hovering) of the touch detection module (e.g., the touch panel 252 or the pen sensor 254) of the main body 500. The electronic device 1 performs the corresponding function in response to a user touch through the proximity touch detection function, and displays it in the display 41 of the cover 400.

Referring to FIG. 47A, the user may press a button 4701 (e.g., 256) at the side of the main body 500. Referring to FIGS. 47B and 47C, the electronic device 1 displays a default interface image 4703 in the display 41 on the surface of the cover 400 in response to the pressed button 4701. The user may touch the content of the default interface image 4703, and the electronic device 1 performs the corresponding function (operation) in response to the user touch. For example, when the user presses a camera button 4705 in the default interface image 4703, the electronic device 1 executes a camera application and switches the display 41 of the cover 400 to a camera interface image 4707. The camera interface image 4707 may include a real-time image acquired using the rear camera 522 (not shown). When the user presses the camera button 4709 in the camera interface image 4707, the electronic device 1 captures the image.

FIGS. 48-52 are diagrams screen shots of the electronic device 1, according to an embodiment of the present invention. When the cover 400 is closed, the electronic device 1 performs the corresponding function in association with the display 41 of the cover 400 in response to the user touch through the proximity touch detection function.

Figure 48A:
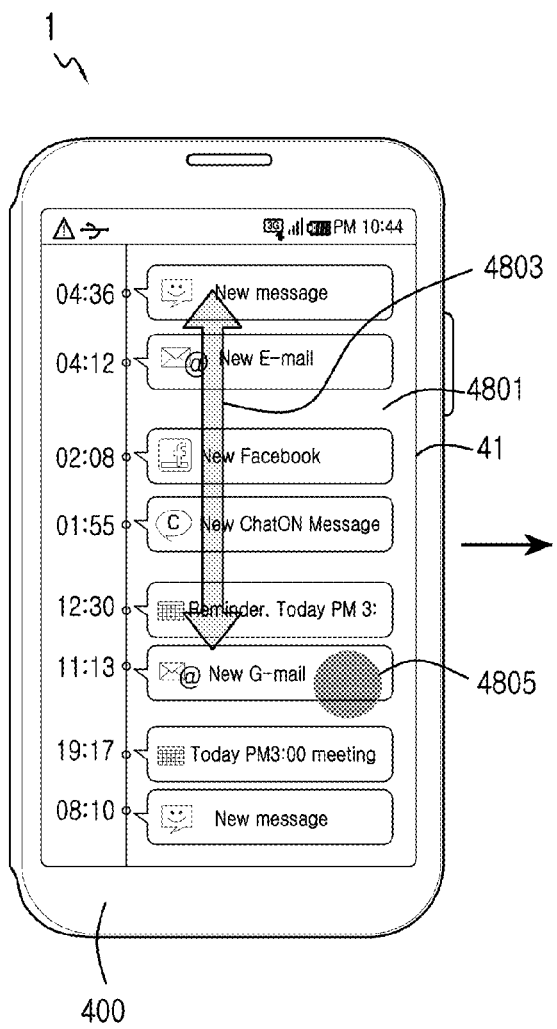
Figure 48B:
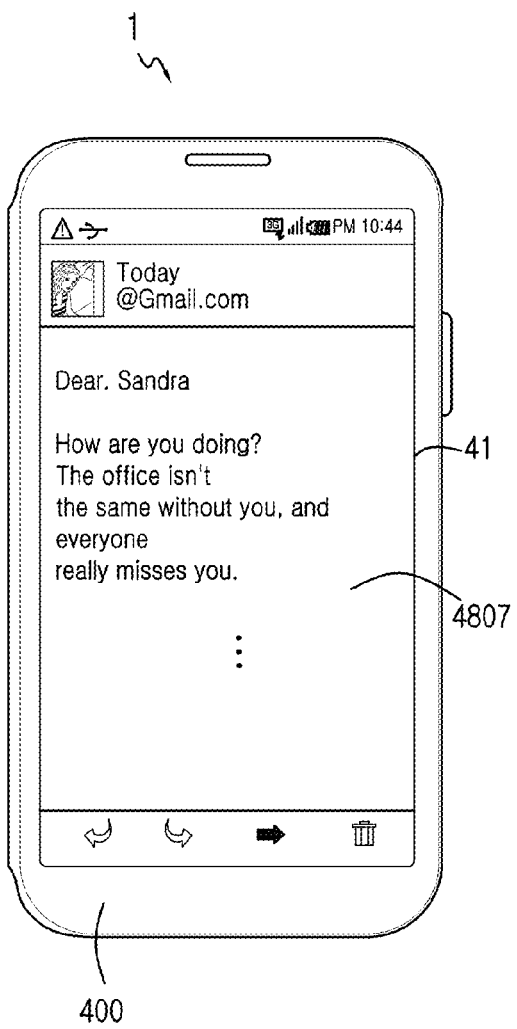

Referring to FIG. 48, the electronic device 1 executes a notice application and displays a related interface image 4801 in the display 41 of the cover 400. The interface image 4801 may include a plurality of notice items. In response to the user touch 4803 (e.g., the drag-and-release or the flicking), the notice items of the interface image 4801 may be scrolled. When the user touches a particular notice item 4805, the electronic device 1 switches the display 41 of the cover 400 to content 4807 of the notice item touched by the user.

Referring to FIGS. 49A 49B, when detecting the separation of the stylus 531, the electronic device 1 executes an application (e.g., a note application) relating to the stylus 531 and displays a related interface image 4901 in the display 41 of the cover 400. The electronic device 1 interlinks the proximity touch detection function of the touch detection module (e.g., the touch panel 252 or the pen sensor 254) of the main body 500 with the display 41 of the cover 400. The interface image 4901 provides a drawing function based on the touch-and-drag input using the stylus 531.

Figure 50:
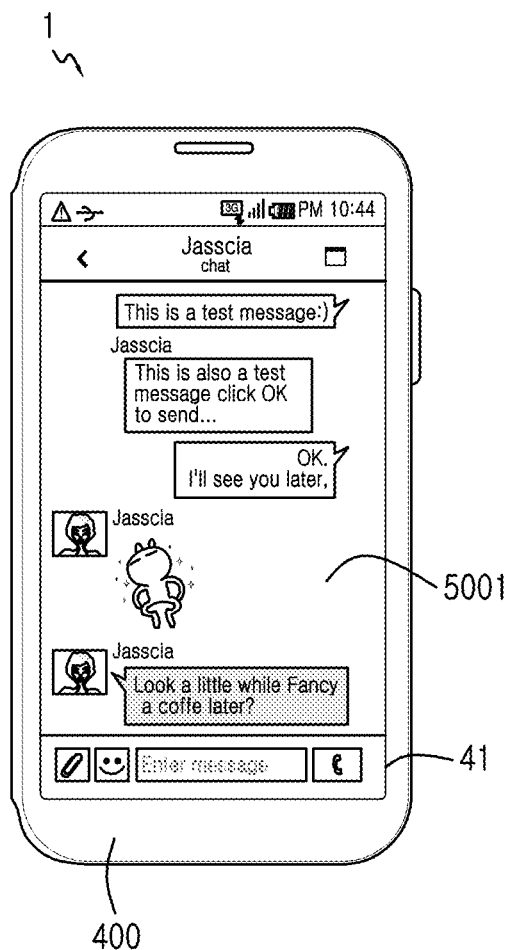

Referring to FIG. 50, the electronic device 1 detects an incoming message and displays a related interface image 5001 in the display 41 of the cover 400. The interface image 5001 may include incoming/outgoing message history.

Figure 51:
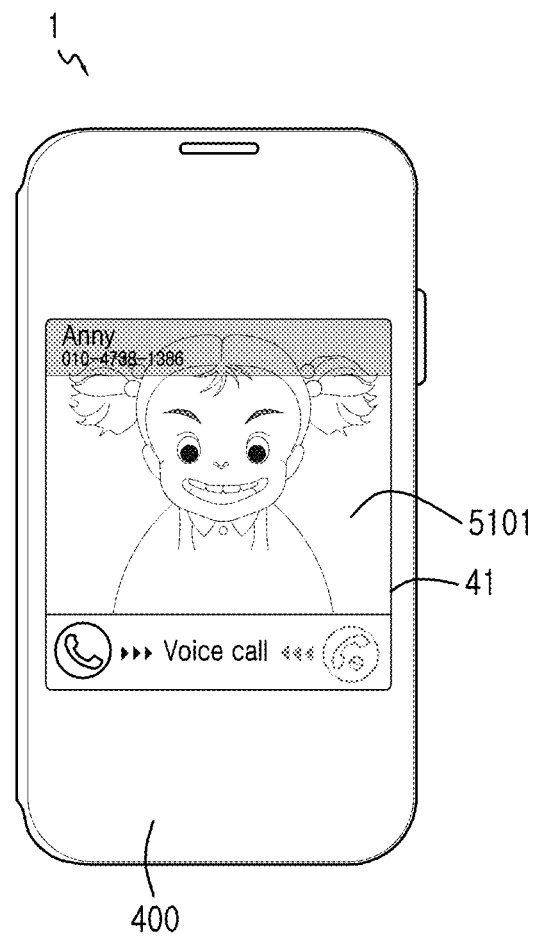

Referring to FIG. 51, the electronic device 1 detects the call and displays a related interface image 5101 in the display 41 of the cover 400. The interface image 5101 provides contents such as caller information, call reception, and call rejection. Although it is not depicted, other various events (e.g., alarm, schedule, etc.) may be applied. As mentioned earlier, the screen area of the display 41 of the cover 400 may be smaller than the screen area of the touch screen 51 of the main body 500.

Figure 52:
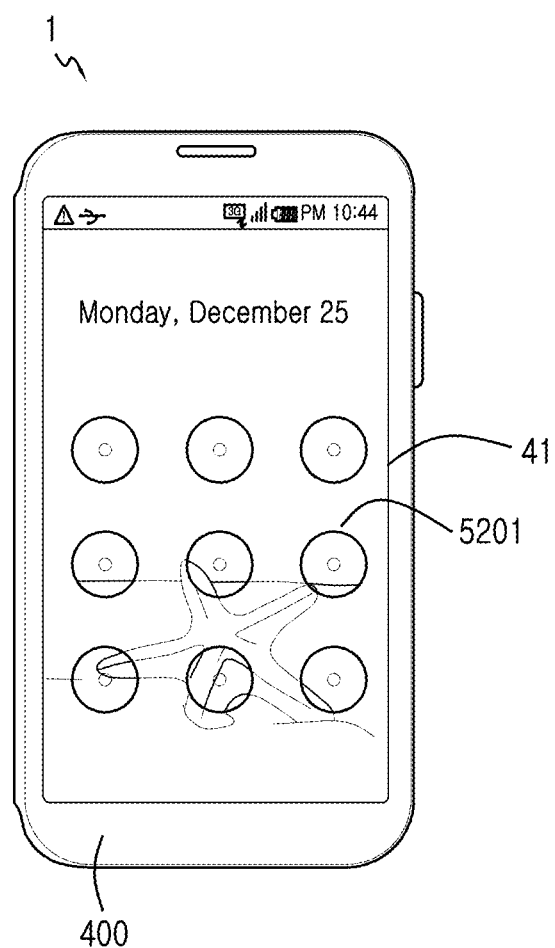

Referring to FIG. 52, the electronic device 1 executes a screen lock application and displays a related interface image 5201 in the display 41 of the cover 400. The interface image 5201 unlocks the screen based on a touch pattern input type. When the user inputs the unlock touch pattern, the electronic device 1 unlocks the screen of the touch screen 51 of the main body 500. Although not shown, the screen lock application may use password or PIN input.

In accordance with the first implementation of the present invention, a method for controlling an electronic device electronically and functionally connectable to a cover, may include detecting a position of the cover according to one of opening and closing of the cover; and controlling one of a first display of the electronic device and a second display of the cover according to the detected position of the cover.

In accordance with the first implementation of the present invention, the controlling one of the first display of the electronic device and the second display of the cover may deactivate the first display when the cover is closed.

In accordance with the first implementation of the present invention, the controlling one of the first display of the electronic device and the second display of the cover may deactivate the second display disposed in a side in the cover facing the first display when the cover is closed.

In accordance with the first implementation of the present invention, the controlling one of the first display of the electronic device and the second display of the cover may activate the second display disposed in an exposed side of the cover when the cover is closed.

In accordance with the first implementation of the present invention, the controlling one of the first display of the electronic device and the second display of the cover may activate the first display when the cover is opened and not overlapped with the electronic device.

In accordance with the first implementation of the present invention, the controlling one of the first display and the second display of the cover may activate or deactivate the second display when the cover is opened and not overlapped with the electronic device.

In accordance with the first implementation of the present invention, the controlling of the first display of the electronic device and the second display of the cover may activate the first display when the cover is opened and overlapped with the electronic device.

In accordance with the first implementation of the present invention, the controlling one of the first display of the electronic device and the second display of the cover may deactivate the second display disposed in a side of the cover facing the first display when the cover is opened and overlapped with the electronic device.

In accordance with the first implementation of the present invention, the controlling one of the first display and the second display of the cover may activate the second display disposed in an exposed side of the cover when the cover is opened and overlapped with the electronic device.

In accordance with the first implementation of the present invention, the controlling one of the first display of the electronic device and the second display of the cover may activate the first display and deactivate the second display when the cover is opened and superposed onto the electronic device.

In accordance with the first implementation of the present invention, the controlling one of the first display of the electronic device and the second display of the cover may deactivate the first display and activate the second display disposed in an exposed side of the cover when the cover is opened and superposed onto the electronic device.

In accordance with the first implementation of the present invention, the controlling one of the first display of the electronic device and the second display of the cover may divide and display at least one content to each of the first display and the second display when both of the first display and the second display are activated.

In accordance with the first implementation of the present invention, the electronic device may further include at least one touch detection module that is overlapped with the first display, and the method may further include controlling the at least one touch detection module according to the detected position of the cover.

In accordance with the first implementation of the present invention, controlling the at least one touch detection module may deactivate the at least one touch detection module when the cover is closed.

In accordance with the first implementation of the present invention, controlling the at least one touch detection module may activate a proximity touch detection function of the at least one touch detection module when the cover is closed.

In accordance with the first implementation of the present invention, controlling one of the first display of the electronic device and the second display of the cover may activate the second display which is disposed in an exposed side of the cover when the cover is closed, and output a corresponding content to the second display in response to a touch detected by the proximity touch detection function of the at least one touch detection module.

In accordance with the first implementation of the present invention, controlling the at least one touch detection module may deactivate the touch detection module when the cover is opened and superposed onto the electronic device.

In accordance with the first implementation of the present invention, controlling the at least one touch detection module may activate the at least one touch detection module when the cover is opened and superposed onto the electronic device.

In accordance with the first implementation of the present invention, both the electronic device and the cover are comprised in a single terminal.

In accordance with the second implementation of the present invention, an electronic device may include a first display; a sensor module configured to obtain detection data relating to one of opening and closing of the cover, wherein the cover is configured to cover at least part of the electronic device and includes a second display; and a processor configured to determine a position of the cover based on the detection data from the sensor module, and control one of the first display of the electronic and the second display of the cover according to the determined position of the cover.

In accordance with the second implementation of the present invention, the position of the cover may include at least one of a position where the cover is closed and superposed below or onto the electronic device, a position where the cover is opened and not superposed with the electronic device, and a position where the cover is opened and superposed below or onto the electronic device.

In accordance with the second implementation of the present invention, the electronic device may further include at least one touch detection module superposed with the first display, and the processor may control the at least one touch detection module according to the determined position of the cover.

In accordance with the second implementation of the present invention, when the cover is closed, the processor may activate the second display disposed in an exposed side of the cover, activate a proximity touch detection function (hovering) of the at least one touch detection module, and output a corresponding content to the second display in response to a touch detected by the proximity touch detection function.

In accordance with the second implementation of the present invention, when at least one preset event occurs, the processor may control content output through the proximity touch detection function.

In accordance with the second implementation of the present invention, the at least one event may include at least one of a preset motion of the electronic device, a push of a preset button, and separation of a stylus.

In accordance with the second implementation of the present invention, the processor may regulate capacitance for the touch detection of the at least one touch detection module according to the determined position of the cover.

In accordance with the second implementation of the present invention, the processor may regulate touch recognition sensitivity of the at least one touch detection module according to the determined position of the cover.

In accordance with the second implementation of the present invention, the sensor module may detect an ambient light at a plurality of locations, and the processor may determine the position of the cover according to a comparison result of the ambient light.

In accordance with the second implementation of the present invention, the sensor module may obtain image data of a subject, and the processor may determine the position of the cover according to whether a face is recognized in the image data.

In accordance with the second implementation of the present invention, the sensor module may include at least one of a gesture sensor, a proximity sensor, a grip sensor, a gyro sensor, an acceleration sensor, a geomagnetic sensor, an atmospheric pressure sensor, a temperature/humidity sensor, a Hall sensor, a red green blue (RGB) sensor, a light sensor, a biometric sensor, an ultraviolet (UV) sensor, and an image sensor.

In accordance with the second implementation of the present invention, the first display and the second display may include one of a liquid crystal display (LCD), an active matrix organic light emitting diode (AMOLED), and an electrophoretic Ink (E-ink).

In accordance with the second implementation of the present invention, both the electronic device and the cover are comprised in a single terminal.

In accordance with the third implementation of the present invention, an electronic device may include a main body comprising a first display; a cover which is one of electronically and functionally coupled to the main body and is configured to cover at least part of the first display; a second display disposed in the cover; a sensor module configured to obtain detection data relating to one of opening and closing of the cover, and a processor configured to determine a position of the cover based on the detection data from the sensor module, and control one of the first display of the main body and the second display of the cover according to the determined position of the cover.

As set forth above, the cover 400 may not only protect the main body 500 but also enhance the displaying using the sub-display which may display the content together with or in lieu of the main display of the main body 500.

The methods as described in the claims and/or the specification of embodiments of the present invention may be implemented using hardware, software, or a combination of them.

As for the software, a computer-readable storage medium may include one or more programs (software modules). One or more programs stored in the computer-readable storage medium may be configured for execution by one or more processors of the electronic device. One or more programs include instructions for controlling the electronic device to execute the methods according to the embodiments as described in the claims and/or the specification of the present invention.

Such a program (software module, software) may be stored to a random access memory, a non-volatile memory including a flash memory, a ROM, an EEPROM, a magnetic disc storage device, a CD-ROM, DVDs or other optical storage devices, and a magnetic cassette. Alternatively, the programs may be stored to a memory combining part or all of those recording media. A plurality of memories may be equipped.

While the invention has been shown and described with reference to certain embodiments thereof, it will be understood by those skilled in the art that various changes in form and details may be made therein without departing from the spirit and scope of the invention as defined by the appended claims and their equivalents.

What is claimed is:

1. A method for controlling an electronic device electrically and functionally connectable to a cover, the method comprising:
   determining a position of the cover according to one of opening and closing of the cover; and
   controlling one of a first display of the electronic device, a second display, and a third display of the cover according to the determined position of the cover,
   wherein controlling one of the first display of the electronic device and the second display of the cover comprises:

displaying a first object on the first display of the electronic device and a second object on the second display which is disposed on a first surface of the cover facing the first display and deactivating the third display which is disposed on a second surface, which is opposite the first surface, of the cover while the cover is open; and displaying the first object on the third display and deactivating the first display and the second display while the cover is closed.

2. The method of claim 1, wherein controlling one of the first display of the electronic device, the second display, and the third display of the cover comprises:

deactivating the third display while the cover is opened; and activating the firs display and the second display.

3. The method of claim 1, wherein controlling one of the first display, the second display, and the third display of the cover comprises:

deactivating the second display and the third display while the cover is opened; and activating the first display.

4. The method of claim 1, wherein controlling one of the first display of the electronic device, the second display and the third display of the cover comprises:

deactivating the first display and the third display while the cover is opened; and activating the second display.

5. The method of claim 1, wherein controlling one of the first display of the electronic device, the second display, and the third display of the cover comprises:

when both of the first display and the second display are activated, dividing and displaying at least one content to each of the first display and the second display.

6. The method of claim 1, further comprising:

controlling at least one touch detection module according to the determined position of the cover, wherein the at least one touch detection module is overlapped with the first display.

7. The method of claim 6, wherein controlling the at least one touch detection module comprises:

deactivating the at least one touch detection module while the cover is closed.

8. The method of claim 6, wherein controlling the at least one touch detection module comprises:

activating a proximity touch detection function of the at least one touch detection module while the cover is closed.

9. The method of claim 8, further comprising:

activating the third display while the cover is closed, and displaying a corresponding content on the third display in response to a touch detected through the third display using the proximity touch detection function of the at least one touch detection module.

10. The method of claim 6, wherein controlling the at least one touch detection module comprises:

deactivating a proximity touch detection function of the at least one touch detection module while the cover is opened.

11. The method of claim 6, wherein controlling at least one touch detection module comprises:

activating a proximity touch detection function of the at least one touch detection module while the cover is opened.

12. An electronic device electrically and functionally connectable to a cover, the electronic device comprising:

a first display;

a sensor module configured to obtain detection data relating to one of opening and closing of the cover, wherein the cover is configured to cover at least part of the electronic device and includes a second display which is disposed on a first surface of the cover facing the first display and a third display which is disposed on a second surface, which is opposite the first surface; and a processor configured to determine a position of the cover based on the detection data from the sensor module, and control one of the first display of the electronic device, the second display, and the third display of the cover according to the determined position of the cover, wherein the processor is configured to:

display a first object on the first display of the electronic device and a second object on the second display and deactivating the third display while the cover is open, and display the first object on the third display and deactivating the first display and the second display while the cover is closed.

13. The electronic device of claim 12, wherein the position of the cover comprises at least one of a position where the cover is closed and superposed onto the electronic device, a position where the cover is opened and not superposed with the electronic device, a position where the cover is opened and superposed on the electronic device, and a position where the cover is opened and superposed bellow the electronic device.

14. The electronic device of claim 12, wherein the electronic device further comprises:

at least one touch detection module superposed with the first display, wherein the processor is further configured to control the at least one touch detection module according to the determined position of the cover.

15. The electronic device of claim 14, wherein the processor is further configured to activate the third display and a proximity touch detection function of the at least one touch detection module while the cover is closed and outputs output a corresponding content on the third display in response to a touch detected through the third display using the proximity touch detection function.

16. The electronic device of claim 15, wherein the processor is further configured to control content output using the proximity touch detection function when at least one preset event occurs, and wherein the at least one event comprises at least one of a preset motion of the electronic device, a push of a preset button, and separation of a stylus.

17. The electronic device of claim 14, wherein the processor is further configured to regulate capacitance for touch detection of the at least one touch detection module according to the determined position of the cover.

18. The electronic device of claim 14, wherein the processor is further configured to regulate touch recognition sensitivity of the at least one touch detection module according to the determined position of the cover.

19. The electronic device of claim 12, wherein the sensor module is further configured to detect a plurality of ambient light values at a plurality of locations on the electronic device, and wherein the processor is further configured to determine the position of the cover based on a comparison result between the ambient light values.

20. The electronic device of claim 12, wherein the sensor module is further configured to obtain image data of a subject, and
wherein the processor is further configured to determine the position of the cover based on whether a face of a user is included in the image data.

* * * * *